US008654998B2

(12) United States Patent (10) Patent No.: US 8,654,998 B2
Nomura et al. (45) Date of Patent: Feb. 18, 2014

(54) HEARING AID APPARATUS

(75) Inventors: Kazuya Nomura, Osaka (JP); Tomohiro Konuma, Osaka (JP); Maki Yamada, Kanagawa (JP); Mitsuru Endo, Tokyo (JP)

(73) Assignee: Panasonic Corporation, Osaka (JP)

( * ) Notice: Subject to any disclaimer, the term of this patent is extended or adjusted under 35 U.S.C. 154(b) by 90 days.

(21) Appl. No.: 13/320,613

(22) PCT Filed: Jun. 16, 2010

(86) PCT No.: PCT/JP2010/004019
§ 371 (c)(1),
(2), (4) Date: Nov. 15, 2011

(87) PCT Pub. No.: WO2010/146857
PCT Pub. Date: Dec. 23, 2010

(65) Prior Publication Data
US 2012/0063620 A1 Mar. 15, 2012

(30) Foreign Application Priority Data
Jun. 17, 2009 (JP) .................................. 2009-144271

(51) Int. Cl.
*H04R 25/00* (2006.01)

(52) U.S. Cl.
USPC ........... 381/313; 381/312; 381/314; 381/317; 381/318; 381/320; 381/321

(58) Field of Classification Search
USPC ................................................. 381/312–331
See application file for complete search history.

(56) References Cited

U.S. PATENT DOCUMENTS 6,865,275 B1 3/2005 Roeck
7,319,769 B2 * 1/2008 Allegro-Baumann et al. ............................. 381/312

(Continued)

FOREIGN PATENT DOCUMENTS

CN 1426667 6/2003
JP 2003-516646 5/2003

(Continued)

OTHER PUBLICATIONS

International Search Report issued Jul. 20, 2010 in International (PCT) Application No. PCT/JP2010/004019.

(Continued)

*Primary Examiner* — Curtis Kuntz
*Assistant Examiner* — Ryan Robinson
(74) *Attorney, Agent, or Firm* — Wenderoth, Lind & Ponack, L.L.P.

(57) ABSTRACT

A call other than a conversion partner call and various sounds are detected by input audio signals from plural microphones without deteriorating a voice recognition precision. A hearing aid apparatus according to the present invention corrects a frequency characteristic of the call voice other than the conversation partner voice based on an arrival direction of the call voice other than the conversation partner voice, which is estimated based on the audio signal converted by the plural microphones, checks a call word standard pattern representing features of a phoneme and a syllabic sound based on other voice data picked up by using the microphones having one characteristic against a call voice other than the conversation partner voice in which the frequency characteristic is corrected by the frequency characteristic correction processing unit to determine whether the call voice is a call word, and forms a directivity in the direction other than the arrival direction of the voice of the conversation partner. Then, the hearing aid apparatus according to the present invention corrects the frequency characteristic of the call voice other than the conversation partner voice so as to provide the same characteristic as that of the microphones at the time of creating the audio standard pattern.

6 Claims, 15 Drawing Sheets

(56) References Cited

U.S. PATENT DOCUMENTS

| | | | |
|---|---|---|---|
| 7,457,426 B2* | 11/2008 | Drtina | 381/313 |
| 8,194,900 B2* | 6/2012 | Fischer et al. | 381/313 |
| 8,238,593 B2* | 8/2012 | Bisgaard et al. | 381/313 |
| 8,325,957 B2* | 12/2012 | Fischer et al. | 381/317 |
| 2001/0028718 A1 | 10/2001 | Hou | |
| 2001/0028720 A1 | 10/2001 | Hou | |
| 2001/0038699 A1 | 11/2001 | Hou | |
| 2004/0081327 A1 | 4/2004 | Jensen | |
| 2008/0205677 A1* | 8/2008 | Bauml et al. | 381/312 |

FOREIGN PATENT DOCUMENTS

| | | |
|---|---|---|
| JP | 2004-133403 | 4/2004 |
| JP | 2004-527177 | 9/2004 |
| WO | 02/085066 | 10/2002 |

OTHER PUBLICATIONS

Sadaoki Furui; "*Cepstral Analysis Technique for Automatic Speaker Verification*"; IEEE Transactions on Acoustics, Speech, and Signal Processing; 1981; pp. 254-272; vol. ASSP-29, No. 2.

T. Kosaka et al.; "*Study on Instantaneous or Incremental Environment Adaptation*", Discussion Paper of Acoustical Society of Japan; Mar. 1997; pp. 137-138; Acoustical Society of Japan; Japan.

Jens Blauert et al.; "*Spatial Hearing*"; 1986; pp. iii, 18-19, 30-31, 34-35 and 88-91; Kajima Institute Publishing Co., Ltd.; Japan.

Office Action issued Nov. 5, 2013 in corresponding Chinese Application No. 2010800215179 (with English translation).

\* cited by examiner

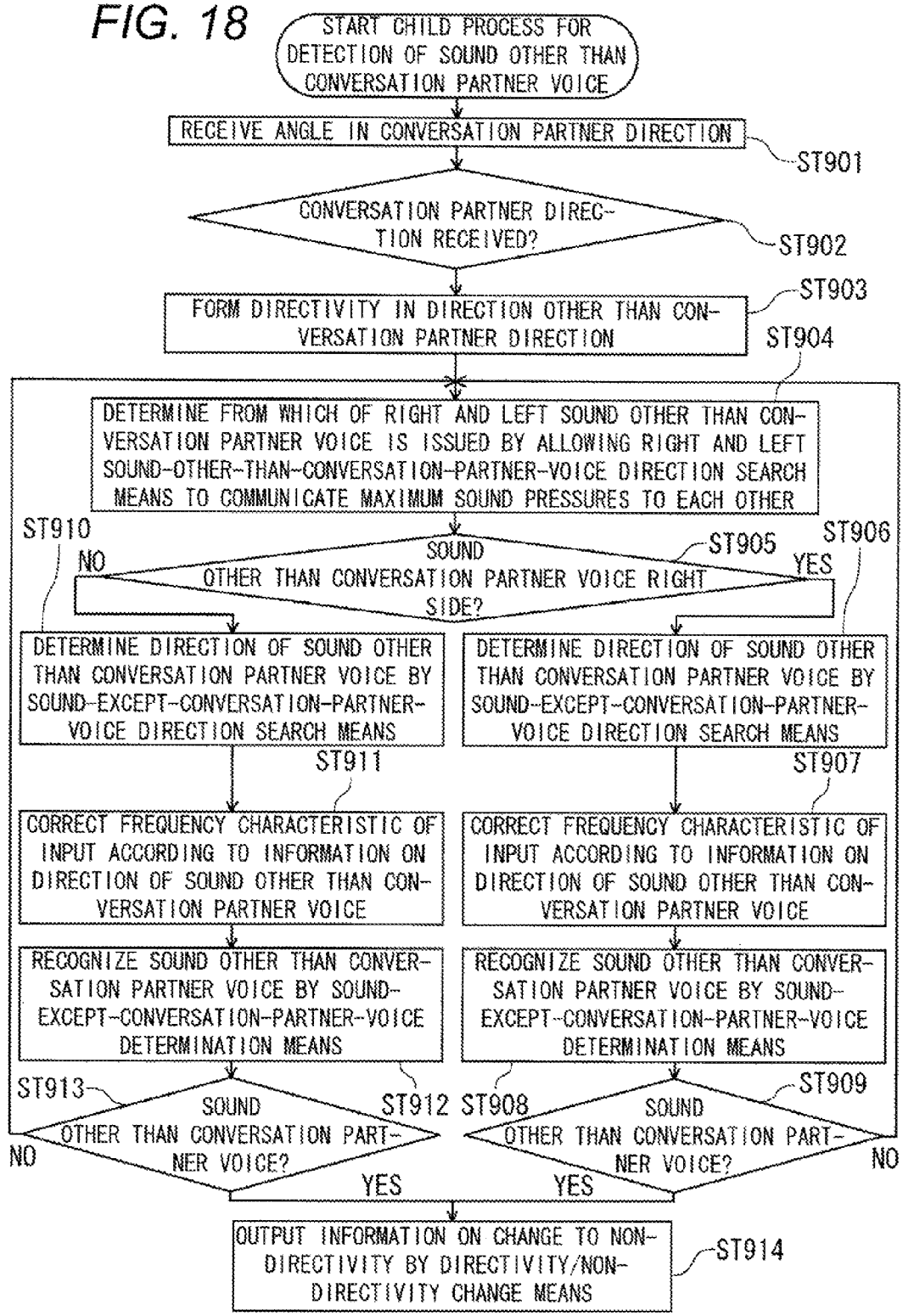

HEARING AID APPARATUS

TECHNICAL FIELD

The present invention relates to a hearing aid apparatus capable of detecting calls or various sounds based on inputs from a plurality of microphones.

BACKGROUND ART

Users of hearing aids have heightened expectations of the hearing aids each having a "conversation emphasizing function" enabling the user to hear an emphasized voice of a conversation partner. As one method for determining whether the voice is issued from the conversion partner at a time of emphasizing the voice of the conversion partner, Patent Document 1 discloses a method for detecting a voice in a conversation with a person wearing the hearing aid according to the consistency of utterance timing. The hearing aid is required to emphasize the voice of the conversation partner, and enables the person wearing the hearing aid to respond to a call from the environment, and to recognize the sound issued from the environmental event.

In a device worn in close contact with an object such as the hearing aid, there occurs such a phenomenon that a frequency characteristic of an input voice is varied depending on an arrival direction (angle) of sound due to an influence of a position of a microphone or a neighborhood shape. For example, when the call is detected by the hearing aid, the hearing aid recognizes the call voice with the input of the voice different in the frequency characteristic depending on the arrival direction (angle) of sound. For that reason, the frequency characteristic of the sound to be recognized deviates from the frequency characteristic of the voice data at the time of learning an audio standard pattern used for collation (in off line), thereby deteriorating the recognition precision of the hearing aid.

As a method for correcting the frequency characteristic of the audio standard pattern used for verification, Non-patent Document 1 discloses a cepstral mean normalization CMS (cepstral mean subtraction CMS). The cepstral mean normalization CMS method (hereinafter referred to as "CMS method") is a method in which a difference of the frequency characteristic of the input voice is estimated by a mean of cepstral of the input voice, and the difference is applied to the input voice for correction. In the CMS method, there is a need to obtain the cepstral mean of the input voice after phonation has been completed, and real-time processing is disabled.

As a method of realizing the real-time processing through the CMS method, Non-patent Document 2 has proposed a MAP-CMS method in which the cepstral mean of the input voice is estimated from the cepstral mean from start of the input voice to the present frame of the input voice, and the cepstral mean of the voice data at the time of learning the audio standard pattern used for verification of the voice recognition (in off line) through MAP estimation to normalize the input voice.

RELATED ART DOCUMENTS

Patent Documents

Patent Document 1: JP-A-2004-133403

Non-Patent Documents

Non-Patent Document 1: S. Furui, "Cepstral Analysis Technique for Automatic Speaker Verification", IEEE Trans. ASSP, vol. ASSP-29, No. 2 pp. 254-272, 1981

Non-Patent Document 2: Kosaka et al., "Study on Instantaneous or Incremental Environment Adaptation", Acoustical Society of Japan, discussion paper, 3-6-25, pp. 137-138, March in 1997

Non-Patent Document 3: Jens Blauert, Masayuki Morimoto, Toshiyuki Goto, "Spatial Hearing", Kajima Institute Publishing Co., Ltd.

SUMMARY OF THE INVENTION

Problem to be Solved by the Invention

However, the above-mentioned CMS method is required to obtain the mean of the cepstrum after phonation has been completed, and conduct a voice recognition process or a sound detection process. Therefore, CMS method cannot be applied to the hearing aid that conducts a hearing process in real time. Also, the above-mentioned MAP-CMS method enables real-time processing for proceeding with the voice recognition process or the sound detection process in synchronism with time. However, the MAP-CMS method does not conduct a process for correcting the voice in the voice data of a frame immediately after the input starts with the result that a precision of the voice recognition is deteriorated.

An object of the present invention is to provide a hearing aid apparatus that can detect a call from a person other than a conversation partner, or various sounds according to input audio signals from a plurality of microphones without deteriorating the recognition precision.

Means for Solving the Problem

The present invention provides a hearing aid apparatus including: a plurality of microphones configured to convert sounds including a voice of a conversation partner, a call voice other than the conversation partner voice, and various sound into audio signals; sound arrival direction estimation means for estimating an arrival direction of the call voice other than the conversation partner voice based on the audio signals converted by the respective microphones; a frequency characteristic correction processing unit configured to correct a frequency characteristic of the call voice other than the conversation partner voice, based on the audio signals converted by the respective microphones and the arrival direction of the call voice other than the conversation partner voice estimated by the sound arrival direction estimation means; an audio standard pattern storage unit configured to store a call word standard pattern representing features of a phoneme and a syllabic sound based on other voice data picked up by a microphone having one characteristic; call word determination means for checking the call voice other than the conversation partner voice of which the frequency characteristic is corrected by the frequency characteristic correction processing unit against the call word standard pattern, and for determining whether the call voice is a call word; direction-except-conversation-partner-direction directivity synthesis means for forming a directivity in a direction other than the arrival direction of the voice of the conversation partner, based on the determination result of the call word determination means; and voice output means for outputting the call voice other than the conversation partner voice based on the directivity formed by the direction-except-conversation-partner-direction directivity synthesis means, wherein the frequency characteristic correction processing unit corrects the frequency characteristic of the call voice other than the conversation partner voice so as to provide the same characteristic as that of the microphone at the time of creating the audio standard pattern used in the call word determination means.

The hearing aid apparatus further includes: conversation partner direction directivity synthesis means for forming the directivity in the arrival direction of the voice of the conversation partner, based on the determination result of the call word determination means. The call word determination means checks the voice data of the conversation partner of which the frequency characteristic is corrected by the frequency characteristic correction processing unit against the call word standard pattern, and if the call word determination means determines that the voice data is the call word, the conversation partner direction directivity synthesis means forms the directivity in the arrival direction of the voice of the conversation partner, and the direction-except-conversation-partner-direction directivity synthesis means forms the directivity in the direction other than the arrival direction of the voice of the conversation partner, and the voice output means outputs the voice of the conversation partner and the call voice other than the conversation partner voice, based on the directivity formed by the conversation partner direction directivity synthesis means in addition to the directivity formed by the direction-except-conversation-partner-direction directivity synthesis means.

In the hearing aid apparatus, the call word determination means checks the voice data of the conversation partner of which the frequency characteristic is corrected by the frequency characteristic correction processing unit against the call word standard pattern, and if the call word determination means determines that the voice data is not the call word, the conversation partner direction directivity synthesis means forms the directivity in the arrival direction of the voice of the conversation partner, and the direction-except-conversation-partner-direction directivity synthesis means does not form the directivity in the direction other than the arrival direction of the voice of the conversation partner, and the voice output means outputs the voice of the conversation partner and the call voice other than the conversation partner voice, based on the directivity formed by the direction-except-conversation-partner-direction directivity synthesis means.

Advantages of the Invention

According to the hearing aid apparatus of the present invention, a call from a person other than a conversation partner or various sounds can be detected according to input audio signals from a plurality of microphones without deteriorating the recognition precision.

BRIEF DESCRIPTION OF THE DRAWINGS

FIG. 18 is a flowchart illustrating a child process for detection of sound other than the voice of the conversation partner in FIG. 17.

MODE FOR CARRYING OUT THE INVENTION

Hereinafter, embodiments of the present invention will be described with reference to the drawings.

(First Embodiment)

Figure 1:
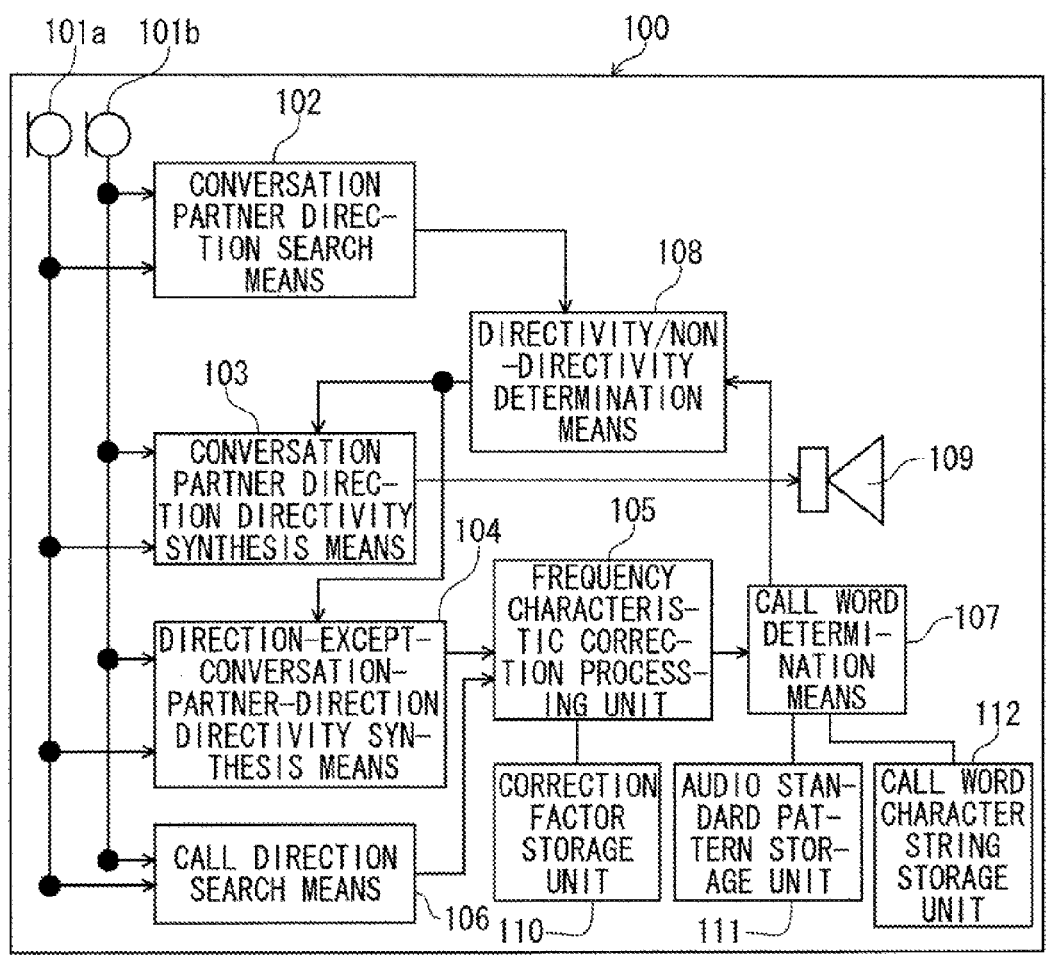
FIG. 1 is a system configuration diagram illustrating a hearing aid according to a first embodiment of the present invention.

FIG. 1 is a block diagram illustrating a configuration of a hearing aid apparatus 100 according to a first embodiment of the present invention. As illustrated in FIG. 1, a hearing aid apparatus 100 according to the first embodiment includes two microphones 101a, 101b, a conversation partner direction search means 102, a conversation partner direction directivity synthesis means 103, a direction-except-conversation-partner-direction directivity synthesis means 104, a frequency characteristic correction processing unit 105, a call direction search means 106, a call word determination means 107, a directivity/non-directivity determination means 108, a speaker 109, a correction factor storage unit 110, an audio standard pattern storage unit 111, and a call word character string storage unit 112.

<Configuration of Hearing Aid Apparatus 100>

The microphones 101a and 101b each pick up an arrival sound such as the voice of a conversation partner, and convert the picked-up sound into an audio signal. Then, the audio signal is output to the conversation partner direction search means 102.

Hereinafter, for description, it is assumed that the sound picked up by each of the microphones includes, in addition to the voice of a conversation partner, a voice (hereinafter referred to as "call voice") with which a person other than a partner who is presently having a conversation calls for a wearer of the hearing aid apparatus 100 from a direction different from the direction along which the conversation partner exists.

Figure 6:
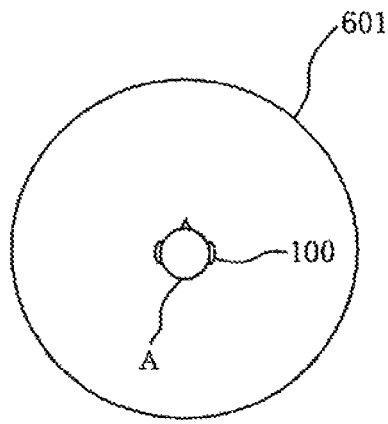
FIG. 6 is a diagram illustrating a non-directional sound pickup state of the hearing aid according to the first embodiment of the present invention.

When the voice of the conversation partner is not picked up by the microphones 101a and 101b, as illustrated in FIG. 6, a directivity pattern 601 indicative of a state in which voices in all directions can be heard through signal processing allocating no directivity is formed on the periphery of a person A who wears the hearing aid apparatus 100 on his right ear.

The conversation partner direction search means 102 detects voice data of the conversation partner based on the audio signals input from the microphones 101a and 101b, and searches an arrival direction of the picked-up voice of the conversation partner. Then, the direction from which the searched voice of the conversation partner arrives is output to the directivity/non-directivity determination means 108.

The call direction search means 106 searches the arrival direction according to the call voices picked-up by the microphones 101a and 101b. The determination of whether there is a call voice is based on, for example, whether a power of the input voice exceeds a given threshold value.

In this case, a head-related transfer function that is a strain attributable to the head and the auricle performs an important role in a directional sense of the person (for example, Non-patent Document 3). Therefore, in this embodiment, as a method of estimating the arrival direction (angle) of sound, the features of a dip frequency and a peak frequency of the head-related transfer function for each angle are compared with a frequency characteristic of the input voice observed at an inlet position of the ear canal to estimate the arrival direction (angle) of the sound.

Then, the call direction search means 106 outputs information on the direction estimated as the arrival direction of the call voice based on the searched call voice to the frequency characteristic correction processing unit 105.

The correction factor storage unit 110 stores the correction factor for each angle in the directivity characteristic of the frequency of the input voice therein. The correction factor takes an influence of the head shape when the hearing aid is worn on the head into account.

The call word character string storage unit 112 stores a call word character string registered as a character string therein. The call word character string stored in the call word character string storage unit 112 is stored in the call word character string storage unit 112 at the time of fitting the hearing aid apparatus 100 in advance.

The audio standard pattern storage unit 111 stores audio standard patterns corresponding to characters (for example, 50 Japanese syllabary characters or alphabets) therein. The audio standard pattern stored in the audio standard pattern storage unit 111 is voice data created as a model representing the feature of each phoneme or syllabic sound based on a large amount of voice data picked up by the aid of a microphone having one characteristic in advance.

The frequency characteristic correction processing unit 105 corrects the call voice data output from the direction-except-conversation-partner-direction directivity synthesis means 104 so as to provide the same characteristic as that of the microphone at the time of creating the audio standard pattern at any time, with the use of the correction factor in the direction that matches the direction of the call voice among the correction factors stored in the correction factor storage unit 110, based on the information on the direction estimated as the arrival direction of the call voice input from the call direction search means 106. Then, the corrected call voice data is output to the call word determination means 107:

The call word determination means 107 creates the call word standard pattern according to "call word character string" stored in the call word character string storage unit 112 and "audio standard pattern" stored in the audio standard pattern storage unit 111. Then, the call word determination means 107 checks the created call word standard pattern against data on the call voice output from the frequency characteristic correction processing unit 105 to determine whether the call word standard pattern is the call word.

When the call word determination means 107 determines that the call voice is the call word, the call word determination means 107 outputs the non-directivity information to the directivity/non-directivity determination means 108. On the other hand, when the call word determination means 107 determines that the call voice of a person except for the conversation partner is not the call word, the call word determination means 107 outputs the directivity information to the directivity/non-directivity determination means 108.

The directivity/non-directivity determination means 108 determines whether the directivity is formed by each of the conversation partner direction directivity synthesis means 103 and the direction-except-conversation-partner-direction directivity synthesis means 104, based on the arrival direction of the voice of the conversation partner input from the conversation partner direction search means 102, and the determination result of the call word determination means 107.

That is, when the call voice from the person except for the conversation partner is included in the voice data in addition to the voice of the conversation partner, the directivity/non-directivity determination means 108 outputs the determination result that the directivity is formed in the conversation partner direction to the conversation partner direction directivity synthesis means 103 based on the arrival direction of the voice of the conversation partner input from the conversation partner direction search means 102, and the non-directivity information output from the call word determination means 107. Further, the directivity/non-directivity determination means 108 outputs the determination result that the directivity is formed in a direction other than the direction of the conversation partner to the direction-except-conversation-partner-direction directivity synthesis means 104.

On the other hand, when the call voice from the person except for the conversation partner is not included in the voice data in addition to the voice of the conversation partner, the directivity/non-directivity determination means 108 outputs the determination result that the directivity is formed in the conversation partner direction based on the arrival direction of the voice of the conversation partner input from the conversation partner direction search means 102, and the directivity information output from the call word determination means 107. Further, the directivity/non-directivity determination means 108 outputs the determination result that the directivity is not formed to the direction-except-conversation-partner-direction directivity synthesis means 104.

The direction-except-conversation-partner-direction directivity synthesis means 104 forms the directivity based on the determination result of the directivity/non-directivity determination means 108. When the directivity/non-directivity determination means 108 determines that the directivity is formed, the direction-except-conversation-partner-direction directivity synthesis means 104 forms the directivity in the directions other than the direction of the conversation partner. For example, as indicated by a directivity pattern 802 in FIG. 8, the directivity is also formed in the directions other than the conversation partner direction for call detection whereby the sound arriving from the directions other than the conversation partner can be detected from the microphones. On the other hand, when the directivity/non-directivity determination means 108 determines that no directivity is formed, the direction-except-conversation-partner-direction directivity synthesis means 104 forms no directivity in the directions other than the direction of the conversation partner.

The conversation partner direction directivity synthesis means 103 forms no directivity based on the determination result of the directivity/non-directivity determination means 108. That is, when the directivity/non-directivity determination means 108 determines that the directivity is formed, the conversation partner direction directivity synthesis means 103 forms the directivity in the direction of the conversation partner based on information on the picked-up voice data of the conversation partner and the direction from which the voice of the conversation partner arrives.

Figure 7:
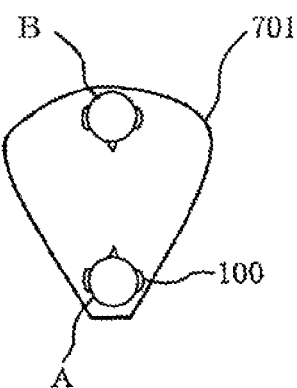
FIG. 7 is a diagram illustrating a state in which directivity is formed in a direction of a conversation partner of the hearing aid according to the first embodiment of the present invention.
Figure 8:
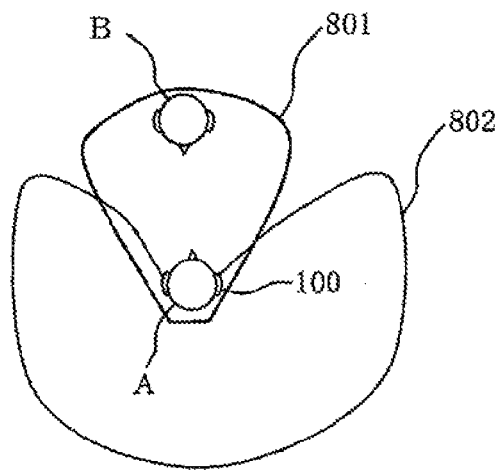
FIG. 8 is a diagram illustrating a state in which the directivity is formed in the direction of the conversation partner of the hearing aid, and the directivity is also formed in directions other than the direction of the conversation partner according to the first embodiment of the present invention.

For example, the conversation partner direction directivity synthesis means 103 changes the directivity to the direction of the conversation partner as indicated by a directivity pattern 701 of FIG. 7 and a directivity pattern 801 illustrated in FIG. 8. On the other hand, the conversation partner direction directivity synthesis means 103 forms no directivity when the directivity/non-directivity determination means 108 determines that no directivity is formed.

Then, the voice data of the conversation partner in which the directivities are synthesized is output to the speaker 109.

The speaker 109 is a voice output means, and outputs the sound of the conversation partner emphasized by the directivity formed by the conversation partner direction directivity synthesis means 103. As a result, the wearer of the hearing aid apparatus 100 can listen to the emphasized sound of the conversation partner.

Further, when the directivity is formed in the direction other than the direction of the conversation partner for call detection by the direction-except-conversation-partner-direction directivity synthesis means 104, the speaker 109 can output the call sound arriving from the direction other than the conversation partner, which has been picked up by the microphones 101*a* and 101*b* while outputting the sound of the conversation partner. As a result, the wearer of the hearing aid apparatus 100 can listen to the call sound arriving from the direction other than the conversation partner in addition to the emphasized sound of the conversation partner.

<Operation of Hearing Aid Apparatus 100>

Figure 2:
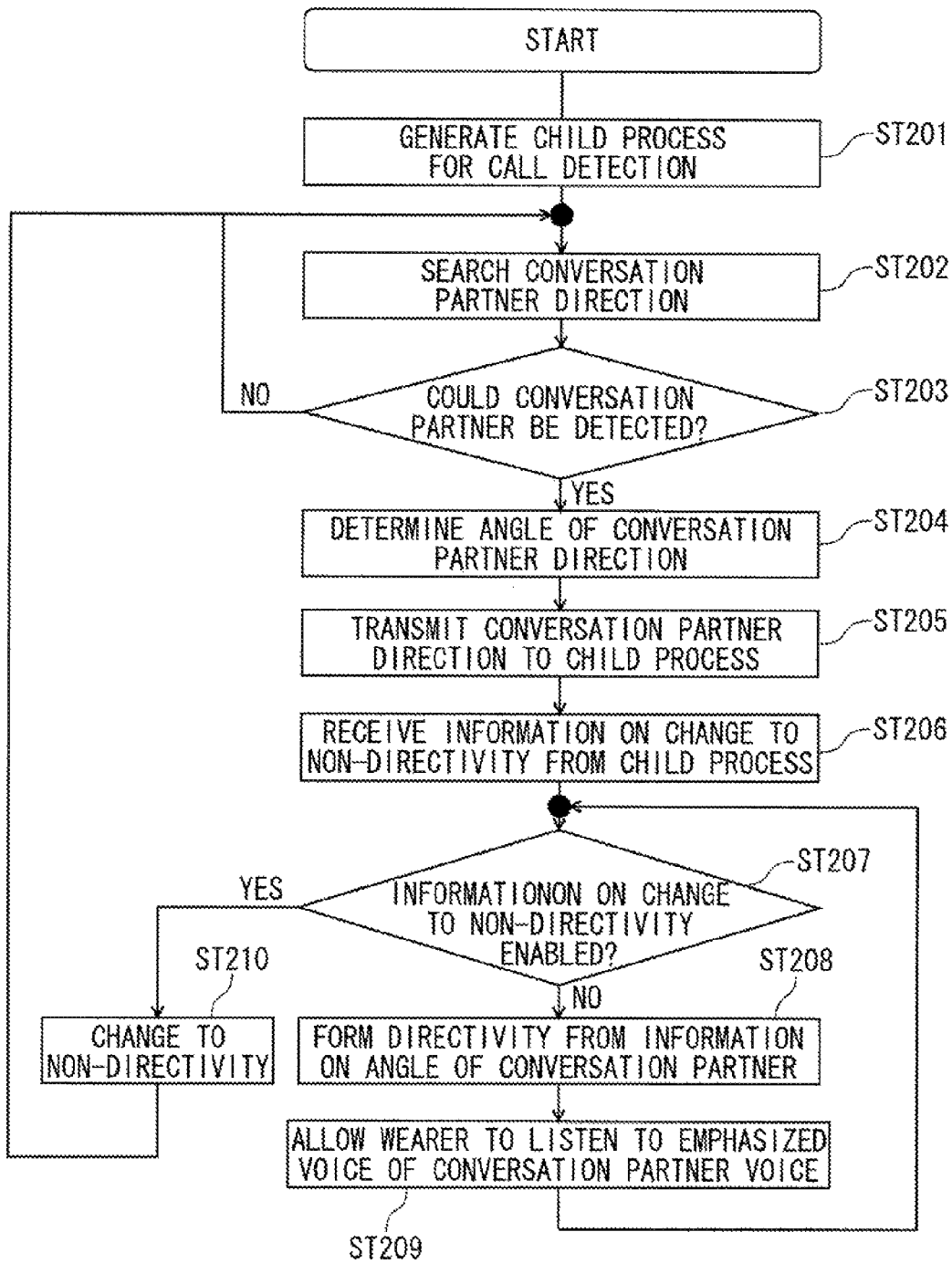
FIG. 2 is a flowchart illustrating a processing procedure of the hearing aid according to the first embodiment of the present invention.
Figure 3:
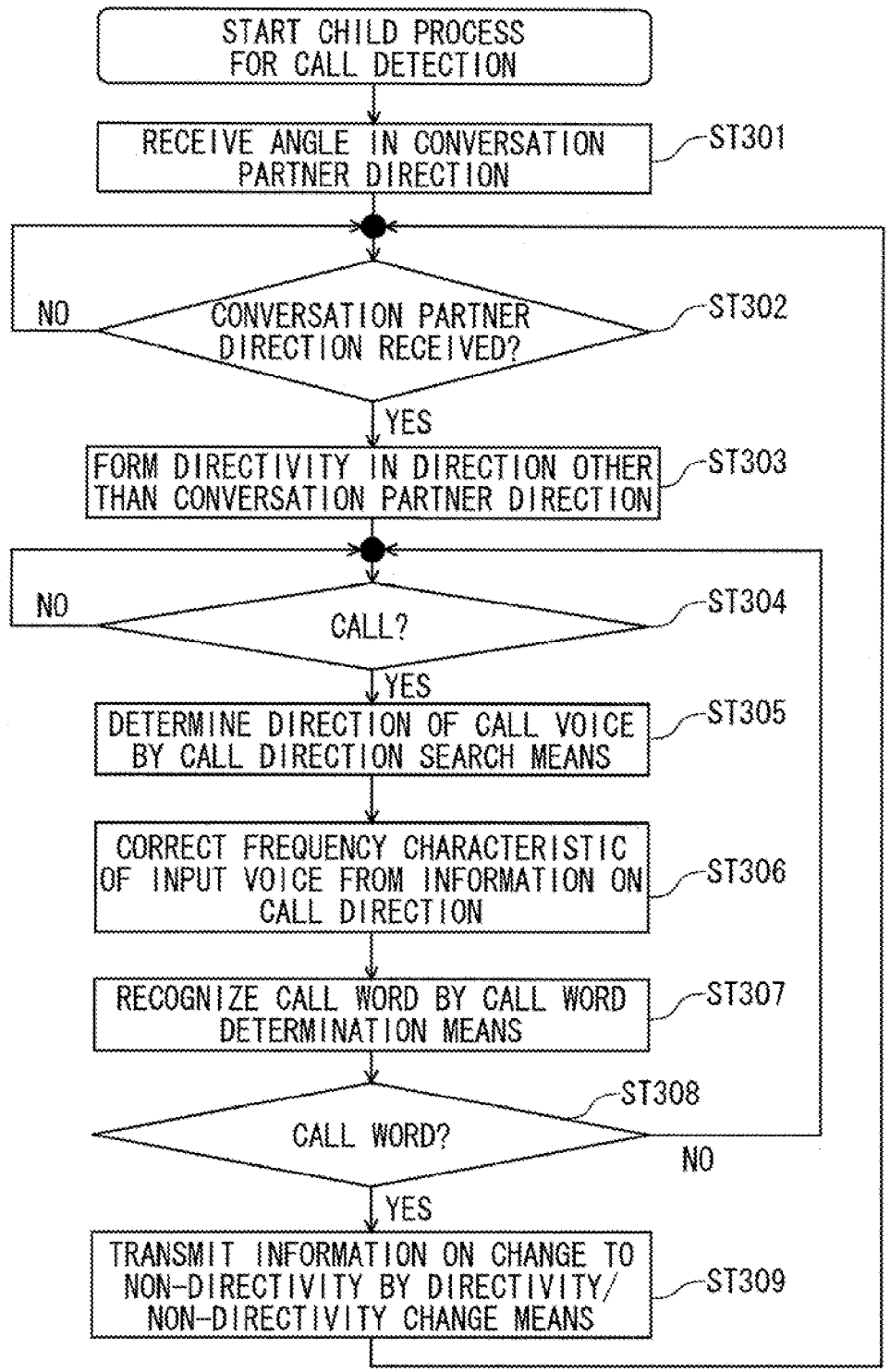
FIG. 3 is a flowchart illustrating a child process for call detection in FIG. 2.

FIG. 2 is a flowchart illustrating a processing procedure of the hearing aid apparatus 100 according to the first embodiment. FIG. 3 is a flowchart illustrating a child process for call detection. The processing procedure of the hearing aid apparatus 100 will be described below with reference to the flowcharts of FIGS. 2 and 3. At first, no conversation starts, and the person A who wears the hearing aid apparatus 100 on his right ear can hear voices from all directions through the signal processing allocating no directivity as indicated by the directivity pattern 601 of FIG. 6.

In Step ST201, the child process for call detection is generated.

In Step ST202, an arrival direction of the voice of the conversation partner is searched by the conversation partner direction search means 102.

In Step ST203, it is detected by the conversation partner direction search means 102, whether there is a conversation partner, based on a result in Step ST202. If the voice of the conversation partner is detected, the processing is branched to Step ST204, and if no voice of the conversation partner is detected, the processing is branched to Step ST202.

In Step ST204, a voice arrival direction of the conversation partner is detected as an angle by the conversation partner direction search means 102.

In Step ST205, the direction of the conversation partner, which has been detected in Step ST204, is transmitted, as the angle, to Step ST301 of the child process for call detection illustrated in FIG. 3.

In Step ST206, information on the change to the non-directivity, which has been transmitted from the child process for call detection illustrated in FIG. 3 is received.

In Step ST207, when it is determined by the directivity/non-directivity determination means 108 that the directivity is synthesized in the direction of the conversation partner, the processing is branched to Step ST208. Also, in Step ST207, when it is determined by the directivity/non-directivity determination means 108 that no directivity is formed, that is, when the directivity is changed to non-directivity, the processing is branched to Step ST210.

In Step ST208, the directivity is synthesized to the direction of a conversation partner B according to the picked-up voice data of the conversation partner and the direction information on the conversation partner direction as indicated by the directivity pattern 701 of FIG. 7.

In Step ST209, the voice data of the conversation partner B in which the directivity is synthesized as illustrated in FIG. 7 is output from the speaker 109, and the wearer A of the hearing aid apparatus 100 listens to the emphasized sound of the conversation partner.

In Step ST210, the directivity is changed to non-directivity as indicated by the directivity pattern 601 illustrated in FIG. 6, and the processing is returned to Step ST201.

<Child Process for Call Detection>

Subsequently, a child process for call detection illustrated in FIG. 3 will be described.

In Step ST301, an angle indicative of the arrival direction of the sound of the conversation partner, which has been transmitted in Step ST205 illustrated in FIG. 2 is received.

In Step ST302, if the angle indicative of the arrival direction of the sound of the conversation partner is received, the processing is branched to Step ST303, and if the angle indicative of the arrival direction of the sound of the conversation partner is not received, the processing is branched to Step ST302.

In Step ST303, the directivity is formed in the conversation partner direction for the purpose of allowing the wearer A of the hearing aid apparatus 100 to emphatically listen to the voice of the conversation partner B as indicated by the directivity pattern 801 illustrated in FIG. 8. Also, the directivity is also formed in the directions other than the conversation partner direction for call detection as indicated by the directivity pattern 802 illustrated in FIG. 8.

In Step ST304, it is determined whether there is a call. If it is determined that there is a call, the processing is branched to Step ST305, and if it is determined that there is no call, the processing is branched to Step ST304. In this example, as one conceivable method for determination of whether there is a call, for example, there is a determination of whether the power of the input sound exceeds a given threshold value.

In Step ST305, the direction of the call sound is determined by the call direction search means 106.

In Step ST306, the correction factor of the frequency characteristic for correcting the voice data which is an input of the call word determination means is called from the information on the angle of the call voice, and applied as needed. How to determine the correction factor of the frequency characteristic will be described later.

In Step ST307, it is determined by the call word determination means 107 whether the corrected input voice data is a call word.

In Step ST308, if it is determined in Step ST307 that the input voice data is a call word, the processing is branched to ST309, and if it is determined that the input voice data is no call word, the processing is branched to ST304.

In Step ST309, the information on the change to non-directivity is transmitted to the conversation partner direction directivity synthesis means 103 and the direction-except-conversation-partner-direction directivity synthesis means 104 by the directivity/non-directivity determination means 108, and the processing is returned to Step ST302.

Through the above-mentioned Step ST210 to Step ST210, and Step ST301 to Step ST309, the hearing aid apparatus 100 according to this embodiment emphasizes the voice of the conversation partner, and changes the directivity to the non-directivity when called. For that reason, the user of the hearing aid can listen to the call voice, and also can have a conversation with a caller.

<How to Determine Correction Factor of Frequency Characteristic>

Figure 4:
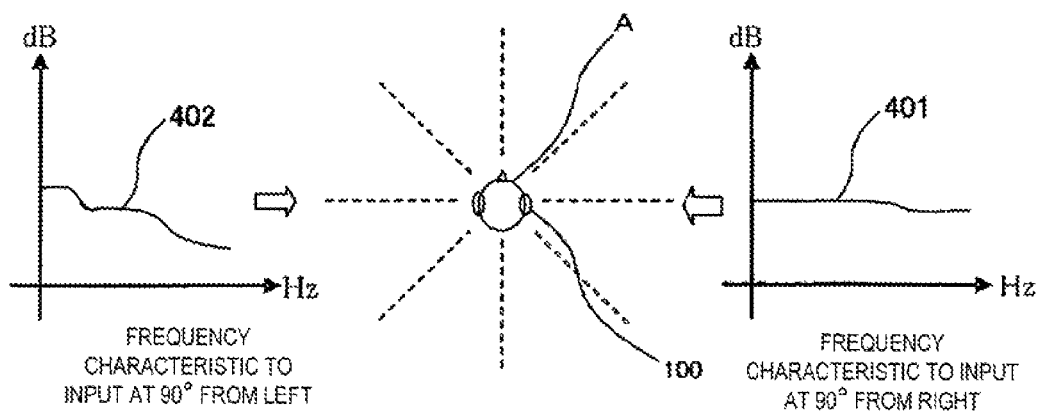
FIG. 4 is a diagram of frequency characteristics depending on a direction (angle) when a microphone is worn on a lateral side of a right head.
Figure 5:
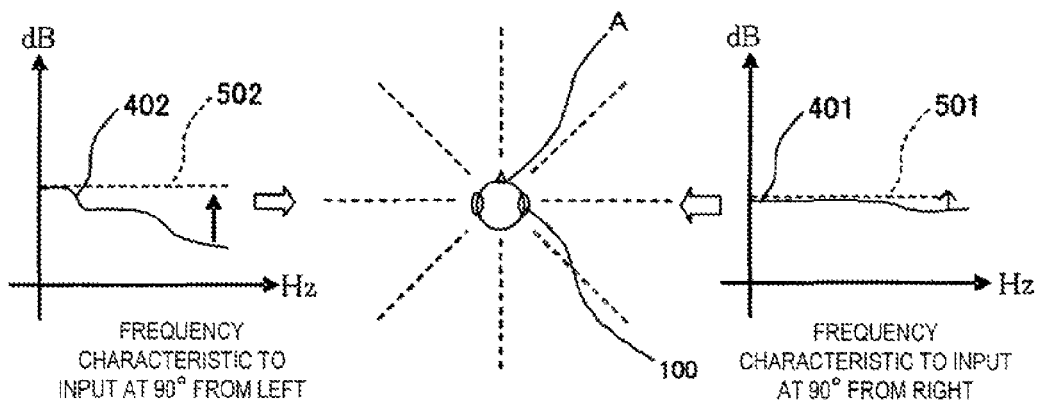
FIG. 5 is a diagram illustrating a correction factor for correcting an input voice to the frequency characteristic of the microphone at the time of creating a audio standard pattern according to the first embodiment of the present invention.

Subsequently, a description will be given of a specific example of a method for calling the correction factor of the frequency characteristic in Step ST306. For example, a description will be given of the correction factor of the frequency characteristic when the wearer A wears the hearing aid apparatus 100 on a lateral side of his right head with reference to FIGS. 4 and 5. FIG. 4 is a diagram of frequency characteristics depending on a direction (angle) when the microphone is worn on a lateral side of his right head. FIG. 5 is a diagram illustrating the correction factor for correcting the input voice to the frequency characteristic of the microphone at the time of creating the audio standard pattern according to the first embodiment of the present invention.

As illustrated in FIG. 4, when the wearer A wears the hearing aid apparatus 100 on a lateral side of his right head, a curve 401 indicative of the frequency characteristic of sound arrival at an angle of 90° from the right is substantially flat not depending on the frequency at a lower frequency side, and slightly falls at a higher frequency side. On the other hand, a curve 402 indicative of the frequency characteristic of sound arrival at an angle of 90° from the left falls more toward a higher frequency region. In this case, the correction factor is determined so that the frequency characteristic of the sound indicated by FIG. 4 is changed to the frequency characteristic of the microphone at the time of creating the audio standard pattern, which is denoted by a broken line 501 in FIG. 5. The frequency characteristic of the microphone at the time of creating the audio standard pattern is used in the call word determination processing unit.

In the case of the frequency characteristic (curve 401) of the sound arrival at an angle of 90° from the right illustrated in FIG. 4, there is no need to correct the low frequency portion, but there is required a correction for changing the frequency characteristic as indicated by an arrow in the high frequency portion. Likewise, in the case of the frequency characteristic (curve 402) of the sound arrival at an angle of 90° from the left illustrated in FIG. 4, the correction factor is more increased toward the higher frequency in the intermediate and high frequencies, thereby enabling the input voice to be corrected to the frequency characteristic of the microphone at the time of creating the audio standard pattern, which is indicated by the broken line 501 in FIG. 5.

As described above, in the hearing aid apparatus 100 according to this embodiment, the frequency characteristic of the input voice is brought close to the frequency characteristic of the voice data at the time of learning the audio standard pattern (in off line) used for checking the voice recognition in the call word determination processing unit with the use of the correction factor. As a result, the real-time processing can be realized without deteriorating the voice recognition precision.

The correction factor may be a value that has been already measured in a general head shape.

Figure 9:
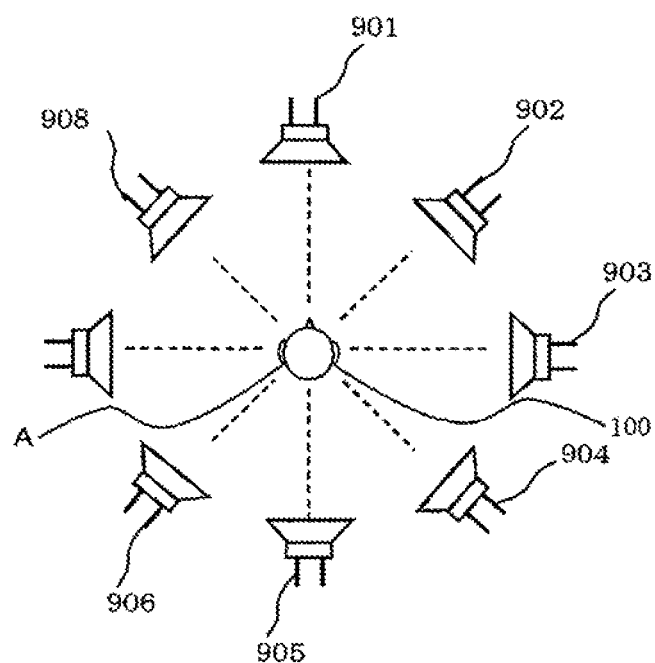
FIG. 9 is a diagram illustrating a correction factor for correcting the input voice to the frequency characteristic of the microphone at the time of creating the audio standard pattern according to the first embodiment of the present invention.

In order to more enhance the precision of the voice recognition, at the time of fitting the hearing aid apparatus 100, as illustrated in FIG. 9, a sound (white noise) for acquiring the correction factors from sound sources 901 to 908, which surrounds the periphery of the head of the person A who wears the hearing aid apparatus 100 on his right ear is reproduced. Then, the reproduced white noise is picked up by the microphones of the hearing aid apparatus 100, and the correction factors are acquired according to the characteristics of the picked-up sound and the characteristics of the microphones at the time of creating the audio standard pattern, which is preferable.

The call word is applied to not only words used when a person calls, but also ringing tones of announcements which are reproduced for the purpose of inviting persons' attention, warning tones in train platforms, klaxons of vehicles, trucks, or buses, audible alarms interlocked with direction indicators, and warming sound produced by household electrical appliances at home for announcing a progress state.

(Second Embodiment)

In the first embodiment, the hearing aid of the type worn on any one ear (right ear) is described as one example. In a second embodiment, a hearing aid of the type worn on both ears is described as another example.

Figure 10:
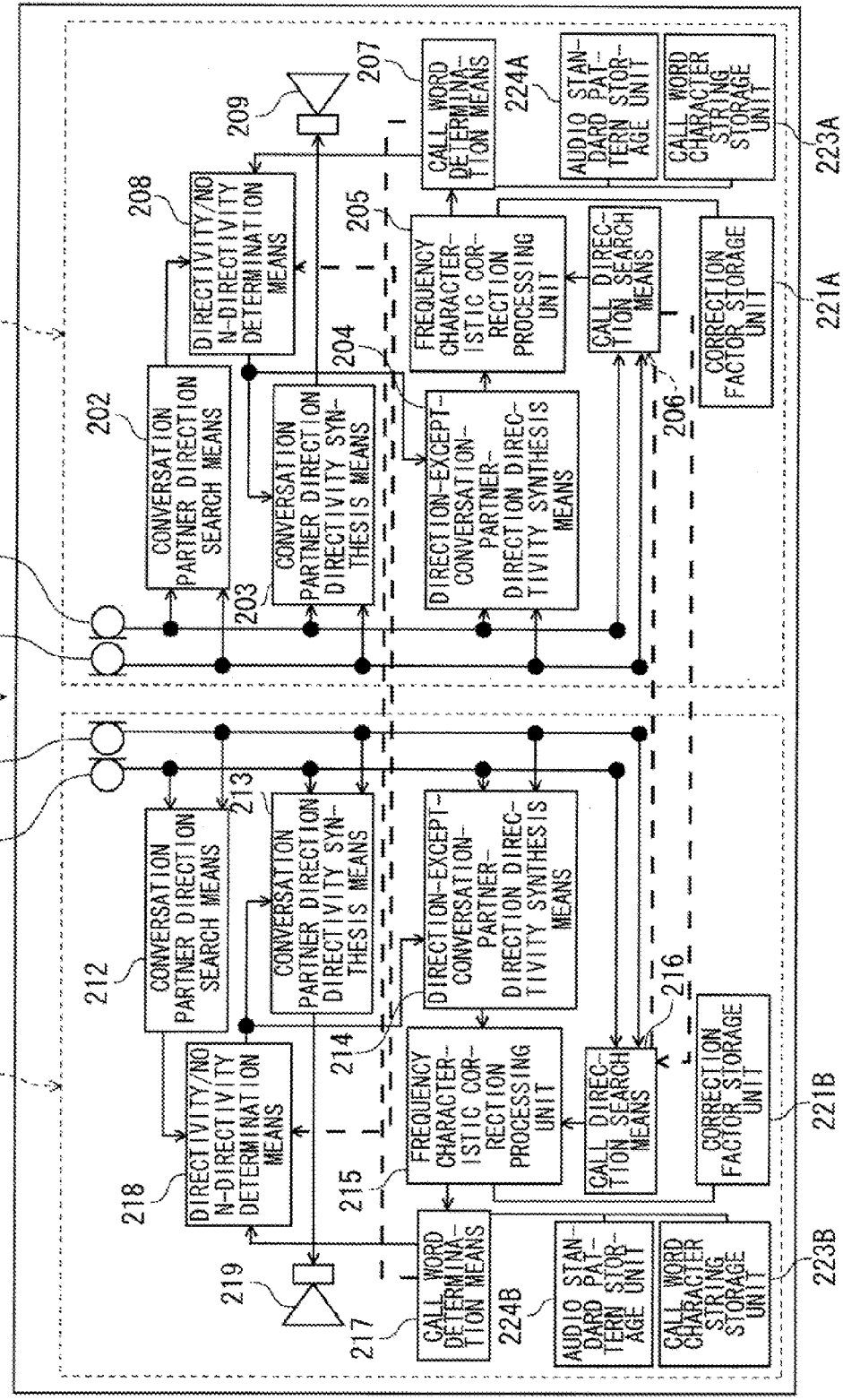
FIG. 10 is a system configuration diagram illustrating a hearing aid according to a second embodiment of the present invention.

FIG. 10 is a block diagram illustrating a configuration of a hearing aid apparatus 200 according to a second embodiment of the present invention. As illustrated in FIG. 10, the hearing aid apparatus 200 according to the second embodiment includes a right ear worn hearing aid 200A, and a left ear worn hearing aid 200B. Referring to FIG. 10, configurations of the respective hearing aids will be described below.

As illustrated in FIG. 10, the right ear worn hearing aid 200A configuring the hearing aid apparatus 200 of the second embodiment includes two microphones 201a and 201b, a conversation partner direction search means 202, a conversation partner direction directivity synthesis means 203, a direction-except-conversation-partner-direction directivity synthesis means 204, a frequency characteristic correction processing unit 205, a call direction search means 206, a call word determination means 207, a directivity/non-directivity determination means 208, a speaker 209, a correction factor storage unit 221A, a call word character string storage unit 223A, and an audio standard pattern storage unit 224A.

Likewise, the left ear worn hearing aid 200B configuring the hearing aid apparatus 200 of the second embodiment includes two microphones 211a and 211b, a conversation partner direction search means 212, a conversation partner direction directivity synthesis means 213, a direction-except-conversation-partner-direction directivity synthesis means 214, a frequency characteristic correction processing unit 215, a call direction search means 216, a call word determination means 217, a directivity/non-directivity determination means 218, a speaker 219, a correction factor storage unit 221B, a call word character string storage unit 223B, and an audio standard pattern storage unit 224B.

Hereinafter, the configuration of the right ear worn hearing aid 200A will be described in detail. In the left ear worn hearing aid 200B, all of the configurations of the same names as those in the right ear worn hearing aid 200A are identical in operation with the configurations of the right ear worn hearing aid 200A, and therefore their detailed description will be omitted.

<Configuration of Right Ear Worn Hearing Aid 200A>

The microphones 201a and 201b each pick up an arrival sound such as the voice of the conversation partner, and convert the picked-up sound into an audio signal. Then, the audio signal is output to the conversation partner direction search means 202.

Hereinafter, for description, it is assumed that the sound picked up by each of the microphones includes, in addition to the voice of a conversation partner, voice (hereinafter referred to as "call voice") with which a person other than a partner who is presently having a conversation calls for a wearer of the hearing aid apparatus 200 from a direction different from the direction along which the conversation partner exists. Also, it is assumed that a call is conducted from a right side of the wearer of the hearing aid apparatus 200.

When the voice of the conversation partner is not picked up by the microphones 101a and 101b, it is assumed that the directivity pattern 601 illustrated in FIG. 6 is formed as in the first embodiment.

The conversation partner direction search means 202 detects voice data of the conversation partner based on the audio signals input from the microphones 201a and 201b, and searches an arrival direction of the picked-up voice of the conversation partner. Then, the direction from which the searched voice of the conversation partner arrives is output to the directivity/non-directivity determination means 208.

The call direction search means 206 searches the arrival direction according to the call voices picked up by the microphones 201a and 201b. The determination of whether there is a call voice is based on, for example, whether a power of the input voice exceeds a given threshold value.

The call direction search means 206 first transmits a maximum sound pressure of the right ear to the call direction search means 216 of the left ear worn hearing aid 200B through a radio communication means such as Bluetooth (Japanese Trademark Registration No. 4477936). Likewise, the call direction search means 206 receives a maximum sound pressure of the left ear from the call direction search means 216 of the left ear worn hearing aid 200B through a radio communication means such as Bluetooth (Japanese Trademark Registration No. 4477936).

Then, the call direction search means 206 compares the maximum sound pressures of both ears with each other, and estimates at which of the right and left sides a call is issued. For example, as a method of searching the call direction, if it is determined that the call is issued at the right side, the call direction search means 206 searches the call direction by realization of a directivity beam due to a delayed sum array, and estimation of a sound source direction due to scanning of the directivity beam. The call direction search means 206 outputs information on a direction estimated as the direction from which the call voice arrives based on the searched call voice to the frequency characteristic correction processing unit 205.

The correction factor storage unit 221A stores the correction factor for each angle in the directivity characteristic of the frequency of the input voice therein. The correction factor takes an influence of the head shape when the hearing aid is worn on the head into account.

The call word character string storage unit 223A stores a call word character string registered as a character string therein. The call word character string stored in the call word character string storage unit 223A is stored in the call word character string storage unit 223A at the time of fitting the hearing aid apparatus 200 in advance.

The audio standard pattern storage unit 224A stores audio standard patterns corresponding to characters (for example, 50 Japanese syllabary characters or alphabets) therein. The audio standard pattern stored in the audio standard pattern storage unit 224A is voice data created as a model representing the feature of each phoneme or syllabic sound based on a large amount of voice data picked up by the aid of a microphone having one characteristic in advance.

The frequency characteristic correction processing unit 205 corrects the voice data of the conversation partner which has been output from the direction-except-conversation-partner-direction directivity synthesis means 104 so as to provide the same characteristic as that of the microphone at the time of creating the audio standard pattern at any time, with the use of the correction factor in the direction that matches the direction of the call voice among the correction factors stored in the correction factor storage unit 221A, based on the information on the direction estimated as the arrival direction of the call voice input from the call direction search means 206. Then, the corrected call voice data is output to the call word determination means 207.

The call word determination means 207 creates the call word standard pattern according to "call word character string" stored in the call word character string storage unit 223A and "audio standard pattern" stored in the audio standard pattern storage unit 224A. Then, the call word determination means 207 checks the created call word standard pattern against data on the call voice output from the frequency characteristic correction processing unit 205 to determine whether the call word standard pattern is the call word.

When the call word determination means 207 determines that the call voice of a person except for the conversation partner is the call word, the call word determination means 207 outputs the non-directivity information to the directivity/non-directivity determination means 218. On the other hand, when the call word determination means 207 determines that the call voice of the person except for the conversation partner is not the call word, the call word determination means 207 outputs the directivity information to the directivity/non-directivity determination means 208.

The directivity/non-directivity determination means 208 determines whether the directivity is formed by each of the conversation partner direction directivity synthesis means 203 and the direction-except-conversation-partner-direction directivity synthesis means 204, based on the arrival direction of the voice of the conversation partner input from the conversation partner direction search means 202, and the determination result of the call word determination means 207.

That is, when the call voice from the person except for the conversation partner is included in the voice data in addition to the voice of the conversation partner, the directivity/non-directivity determination means 208 outputs the determination result that the directivity is formed in the conversation partner direction to the conversation partner direction directivity synthesis means 203 based on the arrival direction of the voice of the conversation partner input from the conversation partner direction search means 202, and the non-directivity information output from the call word determination means 207.

Further, the directivity/non-directivity determination means 208 outputs the determination result that the directivity is formed in a direction other than the direction of the conversation partner to the direction-except-conversation-partner-direction directivity synthesis means 204. On the other hand, when the call voice from the person except for the conversation partner is not included in the voice data in addition to the voice of the conversation partner, the directivity/non-directivity determination means 208 outputs the determination result that the directivity is formed in the conversation partner direction based on the arrival direction of the voice of the conversation partner input from the conversation partner direction search means 202, and the directivity information output from the call word determination means 207.

Further, the directivity/non-directivity determination means 208 outputs the determination result that the directivity is not formed to the direction-except-conversation-partner-direction directivity synthesis means 204.

The direction-except-conversation-partner-direction directivity synthesis means 204 forms the directivity based on the directivity/non-directivity determination means 208 that will be described later. When the directivity/non-directivity determination means 208 determines that the directivity is formed, the direction-except-conversation-partner-direction directivity synthesis means 204 forms the directivity in the directions other than the direction of the conversation partner.

For example, as in the first embodiment, as indicated by the directivity pattern 802 in FIG. 8, the directivity is also formed in the directions other than the conversation partner direction for call detection whereby the sound arriving from the directions other than the direction of the conversation partner can be detected from the microphones. On the other hand, when the directivity/non-directivity determination means 208 determines that no directivity is formed, the direction-except-conversation-partner-direction directivity synthesis means 204 forms no directivity in the directions other than the direction of the conversation partner.

The conversation partner direction directivity synthesis means 203 forms no directivity based on the determination result of the directivity/non-directivity determination means 208. That is, when the directivity/non-directivity determination means 208 determines that the directivity is formed, the conversation partner direction directivity synthesis means 203 synthesizes the directivity in the direction of the conversation partner based on information on the picked-up voice data of the conversation partner and the direction from which the voice of the conversation partner arrives.

For example, the conversation partner direction directivity synthesis means 203 changes the directivity to the direction of the conversation partner as indicated by the directivity pattern 701 of FIG. 7 and the directivity pattern 801 illustrated in FIG. 8. On the other hand, the conversation partner direction directivity synthesis means 203 forms no directivity when the directivity/non-directivity determination means 208 determines that no directivity is formed.

Then, the voice data of the conversation partner in which the directivities are synthesized is output to the speaker 209.

The speaker 209 is a voice output means, and outputs the sound of the conversation partner emphasized by the directivity formed by the conversation partner direction directivity synthesis means 203. As a result, the wearer of the hearing aid apparatus 200 can listen to the emphasized sound of the conversation partner.

Further, when the directivity is also formed in the direction other than the direction of the conversation partner for call detection by the direction-except-conversation-partner-direction directivity synthesis means 204, the speaker 209 can output the call sound arriving from the direction other than the conversation partner, which has been picked up by the microphones 201a and 201b while outputting the sound of the conversation partner. As a result, the wearer of the hearing aid apparatus 200 can listen to the call sound arriving from the direction other than the conversation partner in addition to the emphasized sound of the conversation partner.

<Operation of Hearing Aid Apparatus 200>

Figure 11:
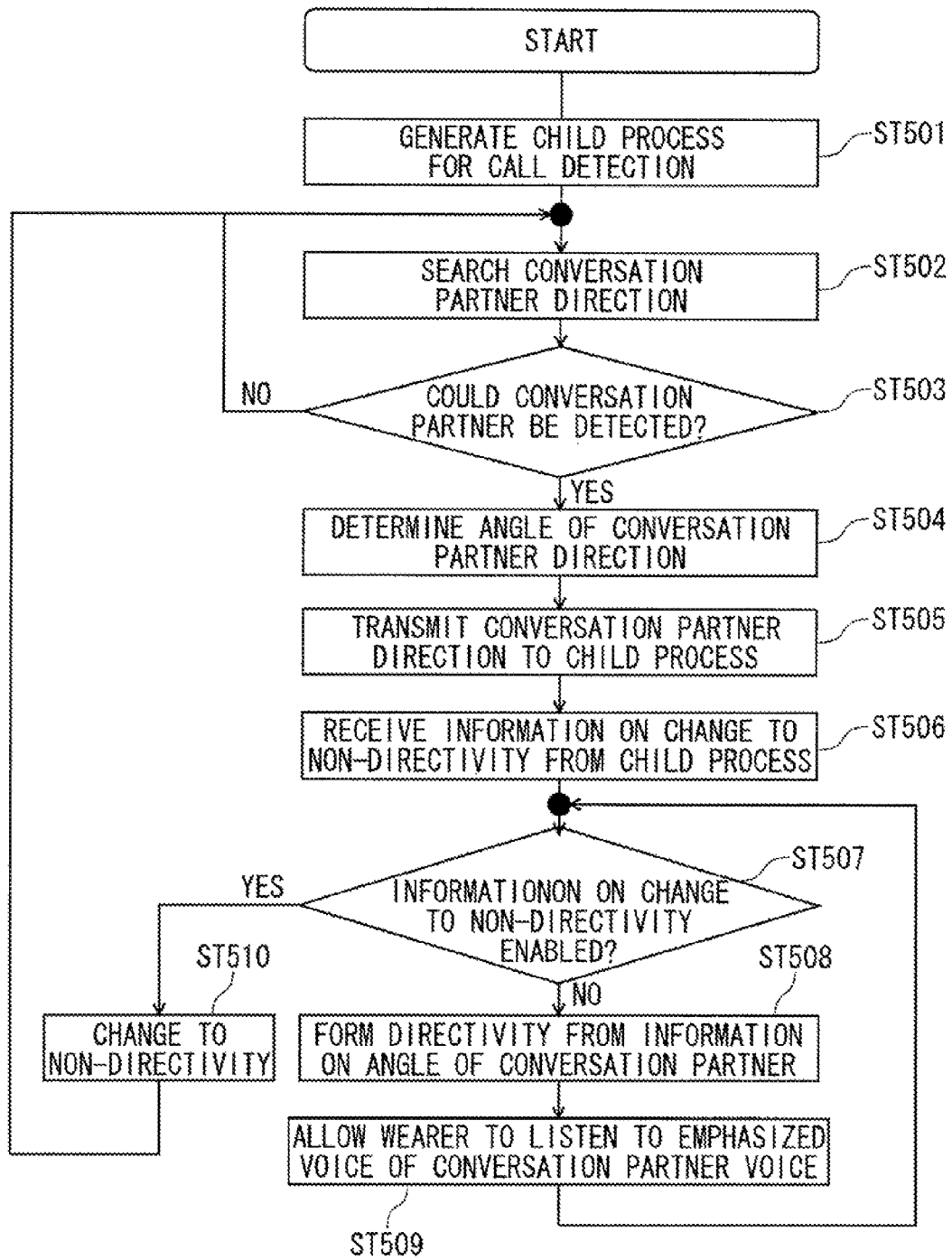
FIG. 11 is a flowchart illustrating a processing procedure of the hearing aid according to the second embodiment of the present invention.
Figure 12:
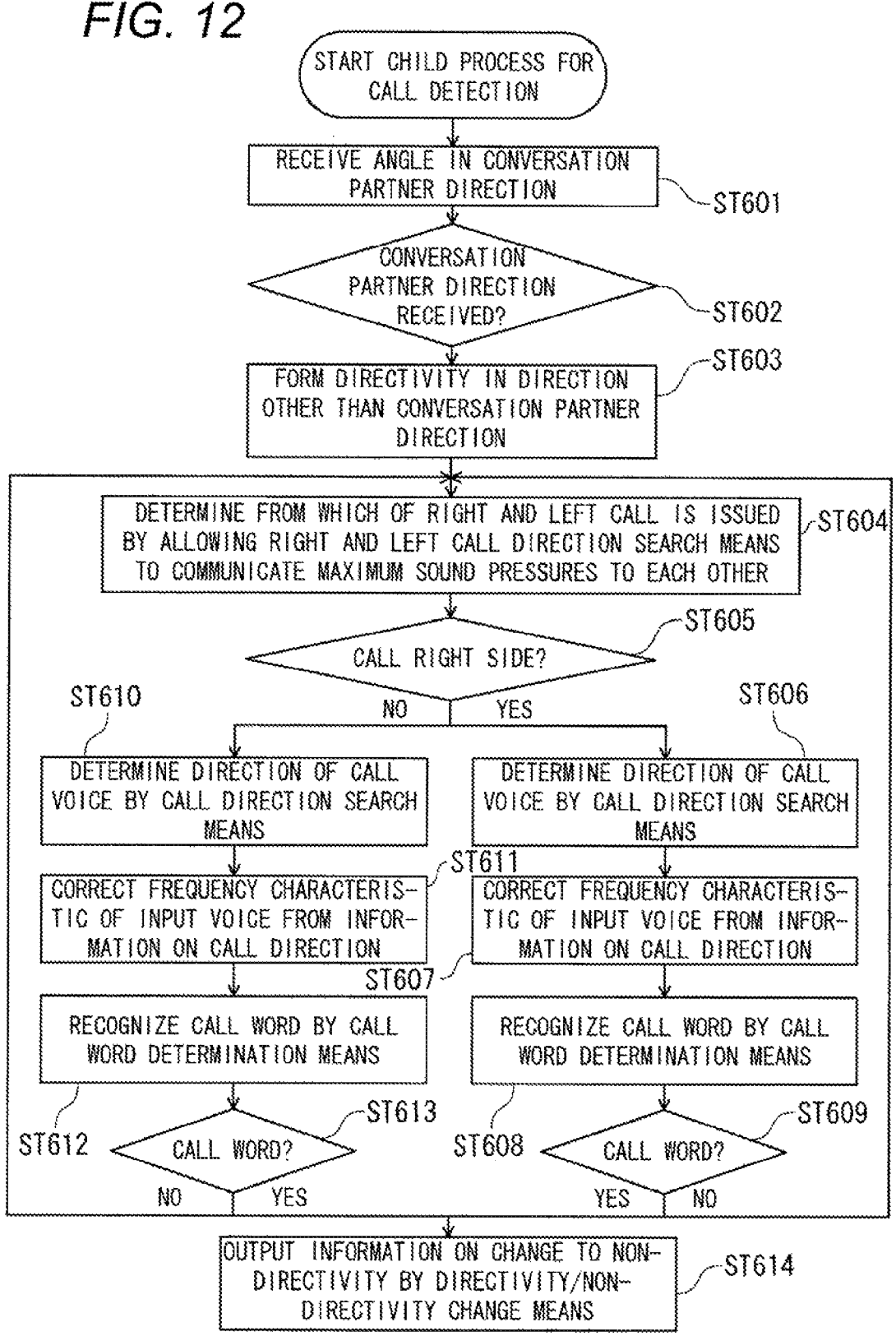
FIG. 12 is a flowchart illustrating a child process for call detection in FIG. 11.

FIG. 11 is a flowchart illustrating a processing procedure of the hearing aid apparatus 200 according to the second embodiment. FIG. 12 is a flowchart illustrating a child process for call detection. The processing procedure of the hearing aid apparatus 200 will be described below with reference to the flowcharts of FIGS. 11 and 12. At first, no conversation starts, and a wearer can hear voices from all directions as indicated by the directivity pattern 601 of FIG. 6.

In Step ST501, the child process for call detection is generated.

In Step ST502, an arrival direction of the voice of the conversation partner is searched by the conversation partner direction search means 202.

In Step ST503, it is detected by the conversation partner direction search means 102, whether there is a conversation partner, based on a result in Step ST502. If the voice of the conversation partner is detected, the processing is branched to Step ST504, and if no voice of the conversation partner is detected, the processing is branched to Step ST502.

In Step ST504, a voice arrival direction of the conversation partner is detected as an angle by the conversation partner direction search means 202.

In Step ST505, the direction of the conversation partner, which has been detected in Step ST504, is transmitted, as the angle, to Step ST601 of the child process for call detection illustrated in FIG. 12.

In Step ST506, information on the change to the non-directivity, which has been transmitted from the child process for call detection illustrated in FIG. 12 is received.

In Step ST507, when it is determined by the directivity/non-directivity determination means 208 that the directivity is synthesized in the direction of the conversation partner, the processing is branched to Step ST508. Also, in Step ST507, when it is determined by the directivity/non-directivity determination means 208 that no directivity is formed, that is, when the directivity is changed to non-directivity, the processing is branched to Step ST510.

In Step ST508, the directivity is synthesized to the direction of the conversation partner B according to the picked-up voice data of the conversation partner and the direction information on the conversation partner direction as indicated by the directivity pattern 701 of FIG. 7.

In Step ST509, the voice data of the conversation partner B in which the directivity is synthesized as illustrated in FIG. 7 is output from the speaker 109, and the wearer A of the hearing aid apparatus 200 listens to the emphasized sound of the conversation partner.

In Step ST510, the directivity is changed to non-directivity as indicated by the directivity pattern 601 illustrated in FIG. 6, and the processing is returned to Step ST501.

<Child Process for Call Detection>

Subsequently, a child process for call detection illustrated in FIG. 12 will be described.

In Step ST601, an angle indicative of the arrival direction of the sound of the conversation partner, which has been transmitted in Step ST505 illustrated in FIG. 2 is received.

In Step ST602, if the angle indicative of the arrival direction of the sound of the conversation partner is received, the processing is branched to Step ST603, and if the angle indicative of the arrival direction of the sound of the conversation partner is not received, the processing is branched to Step ST602.

In Step ST603, as in the first embodiment, the directivity is formed in the conversation partner direction for the purpose of allowing the wearer A of the hearing aid apparatus 200 to emphatically listen to the voice of the conversation partner B as indicated by the directivity pattern 801 illustrated in FIG. 8. Also, the directivity is also formed in the directions other than the conversation partner direction for call detection as indicated by the directivity pattern 802 illustrated in FIG. 8.

In Step ST604, the right and left hearing aids communicate the maximum sound pressures to each other, and it is determined from which of the right and left hearing aids a call is issued, through the call direction search means 206.

In Step ST605, based on the determination result in ST604, if the call is issued from the right side, the processing is branched to Step ST606, and if the call is issued from the left side, the processing is branched to Step ST610.

In Step ST606, the direction of the call sound is determined by the call direction search means 206 in the right ear worn hearing aid 200A.

In Step ST607, the correction factor of the frequency characteristic for correcting the voice data which is an input of the call word determination means 207 is called from the information on the angle of the call voice, and applied as needed. How to determine the correction factor of the frequency characteristic is identical with that in the first embodiment, and therefore its detailed description will be omitted.

In Step ST608, it is determined whether the corrected input voice data is a call word, by the call word determination means 207 in the right ear worn hearing aid 200A.

In Step ST609, if it is determined in Step ST608 that the input voice data is a call word, the processing is branched to ST614, and if it is determined that the input voice data is no call word, the processing is branched to ST604.

In Step ST610, the direction of the call sound is determined by the call direction search means 216 in the left ear worn hearing aid 200B.

In Step ST611, the correction factor of the frequency characteristic for correcting the voice data which is an input of the call word determination means 207 is called from the information on the angle of the call voice, and applied as needed. How to determine the correction factor of the frequency characteristic is identical with that in the first embodiment, and therefore its detailed description will be omitted.

In Step ST612, it is determined whether the corrected input voice data is a call word, by the call word determination means 217 in the left ear worn hearing aid 200B.

In Step ST613, if it is determined in Step ST612 that the input voice data is a call word, the processing is branched to ST614, and if it is determined that the input voice data is no call word, the processing is branched to ST604.

In Step ST614, if a call is issued from the right side, the information on the change to non-directivity is transmitted to the conversation partner direction directivity synthesis means 203 and the direction-except-conversation-partner-direction directivity synthesis means 204 in the right ear worn hearing aid 200A by the directivity/non-directivity determination means 208 of the right ear worn hearing aid 200A, and the processing is returned to Step ST602.

Likewise, if a call is issued from the left side, the information on the change to non-directivity is transmitted to the conversation partner direction directivity synthesis means 213 and the direction-except-conversation-partner-direction directivity synthesis means 214 in the left ear worn hearing aid 200B by the directivity/non-directivity determination means 218 of the left ear worn hearing aid 200B, and the processing is returned to Step ST602.

Through the above-mentioned Step ST501 to Step ST510, and Step ST601 to Step ST614, the hearing aid apparatus 200 according to this embodiment emphasizes the voice of the conversation partner, and changes the directivity to the non-directivity when called. For that reason, the user of the hearing aid can listen to the call voice, and also can have a conversation with a caller.

(Third Embodiment)

Figure 13:
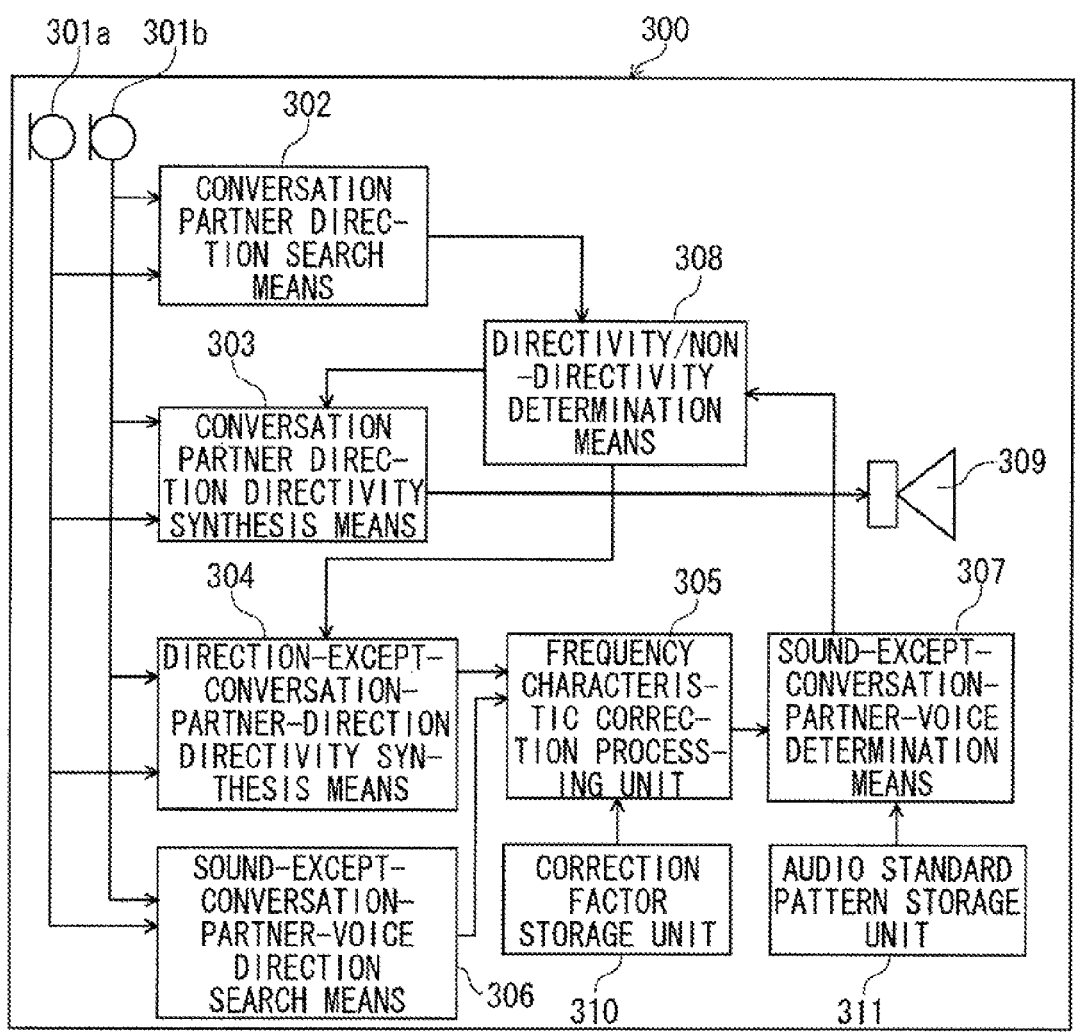
FIG. 13 is a system configuration diagram illustrating an audio signal processing device according to a third embodiment of the present invention.

FIG. 13 is a block diagram illustrating a configuration of an audio signal processing device 300 according to a third embodiment of the present invention. As illustrated in FIG. 13, the audio signal processing device 300 according to the third embodiment includes two microphones 301a, 301b, a conversation partner direction search means 302, a conversation partner direction directivity synthesis means 303, a direction-except-conversation-partner-direction directivity synthesis means 304, a frequency characteristic correction processing unit 305, a sound-except-conversation-partner-voice direction search means 306, a sound-except-conversation-partner-voice determination means 307, a directivity/non-directivity determination means 308, a speaker 309, a correction factor storage unit 310, and a audio standard pattern storage unit 311.

<Configuration of Audio Signal Processing Device 300>

The microphones 301a and 301b each pick up an arrival sound such as the voice of a conversation partner, and convert the picked-up sound into an audio signal. Then, the audio signal is output to the conversation partner direction search means 302.

Hereinafter, for description, it is assumed that the sound picked up by each of the microphones includes, in addition to the voice of the conversation partner, a sound or voice other than the conversation partner voice (hereinafter referred to as "sound other than the conversation partner voice") which attains at a wearer of the audio signal processing device 300 from a direction different from the direction along which the conversation partner exists by a person other than the partner who is presently having a conversation.

When the voice of the conversation partner is not picked up by the microphones 301a and 301b, as illustrated in FIG. 6, the directivity pattern 601 indicative of a state in which voices in all directions can be heard through signal processing allocating no directivity is formed (created) on the periphery of the person A who wears the audio signal processing device 300 on his right ear.

The conversation partner direction search means 302 detects voice data of the conversation partner based on the audio signals input from the microphones 301a and 301b, and searches an arrival direction of the picked-up voice of the conversation partner. Then, the direction from which the searched voice of the conversation partner arrives is output to the directivity/non-directivity determination means 308.

The sound-except-conversation-partner-voice direction search means 306 searches the arrival direction according to the sound other than the conversation partner voice, which has been picked-up by the microphones 301a and 301b. The determination of whether there is the sound other than the conversation partner voice is based on, for example, whether a power of the input voice exceeds a given threshold value.

In this case, a head-related transfer function that is a strain attributable to the head and the auricle performs an important role in a directional sense of the person (for example, Non-patent Document 3). Therefore, in this embodiment, as a method of estimating the arrival direction (angle) of sound, the features of a dip frequency and a peak frequency of the head-related transfer function for each angle are compared with a frequency characteristic of the input voice observed at an inlet position of the ear canal to estimate the arrival direction (angle) of the sound. Then, the sound-except-conversation-partner-voice direction search means 306 outputs, to the frequency characteristic correction processing unit 305, information on the direction estimated as the arrival direction of the sound other than the conversation partner voice based on the searched sound other than the conversation partner voice call voice.

The correction factor storage unit 310 stores the correction factor for each angle in the directivity characteristic of the frequency of the input voice therein. The correction factor takes an influence of the head shape when the hearing aid is worn on the head into account. The audio standard pattern stored in the audio standard pattern storage unit 311 is a pattern created in advance from a large amount of data of the sound other than the conversation partner voice, which has been picked up with the use of the microphones having one characteristic.

The frequency characteristic correction processing unit 305 corrects the sound data other than the conversation partner voice which has been output from the direction-except-conversation-partner-direction directivity synthesis means 304 so as to provide the same characteristic as that of the microphone at the time of creating the audio standard pattern at any time, with the use of the correction factor in the direction (angle) that matches the direction of the sound other than the conversation partner voice among the correction factors stored in the correction factor storage unit 310, based on the information on the direction (angle) estimated as the arrival direction of the sound other than the conversation partner voice, which has been input from the sound-except-conversation-partner-voice direction search means 306. Then, the corrected sound data other than the conversation partner voice is output to the sound-except-conversation-partner-voice determination means 307.

The sound-except-conversation-partner-voice determination means 307 checks the audio standard pattern stored in the audio standard pattern storage unit 311 against data on the sound other than the conversation partner voice, which has been output from the frequency characteristic correction processing unit 305 to determine whether the audio standard pattern is the sound other than the conversation partner voice.

When the sound-except-conversation-partner-voice determination means 307 determines that the audio standard pattern is the sound other than the conversation partner voice, the sound-except-conversation-partner-voice determination means 307 outputs a flag indicative of the sound other than the conversation partner voice to the directivity/non-directivity determination means 308. On the other hand, when the sound-except-conversation-partner-voice determination means 307 determines that the audio standard pattern is not the sound other than the conversation partner voice, the sound-except-conversation-partner-voice determination means 307 does not output the flag indicative of the sound other than the conversation partner voice to the directivity/non-directivity determination means 308.

The directivity/non-directivity determination means 308 determines whether the directivity is formed by each of the conversation partner direction directivity synthesis means 303 and the direction-except-conversation-partner-direction directivity synthesis means 304, based on the arrival direction of the voice of the conversation partner input from the conversation partner direction search means 302, and the determination result of the sound-except-conversation-partner-voice determination means 307.

That is, when the sound other than the conversation partner voice from a person except for the conversation partner is included in the voice data in addition to the voice of the conversation partner, if the direction (angle) from which the voice of the conversation partner, which has been input from the conversation partner direction search means 302, arrives, is output, and the flag indicative of the sound other than the conversation partner voice are output from the sound-except-conversation-partner-voice determination means 307, the directivity/non-directivity determination means 308 outputs the determination result that the directivity is formed in the conversation partner direction to the conversation partner direction directivity synthesis means 303. Further, the directivity/non-directivity determination means 308 outputs the determination result that the directivity is also formed in the direction other than the direction of the conversation partner to the direction-except-conversation-partner-direction directivity synthesis means 304.

On the other hand, when the sound other than the conversation partner voice is not included in the voice data, and the flag indicative of the sound other than the conversation partner voice is not output from the sound-except-conversation-partner-voice determination means 307, the directivity/non-directivity determination means 308 outputs the determination result that the directivity is formed in the conversation partner direction to the conversation partner direction directivity synthesis means 303. Further, the directivity/non-directivity determination means 308 outputs the determination result that the directivity is formed in the direction other than the direction of the conversation partner thereto based on the direction (angle) from which the voice of the conversation partner, which has been input from the conversation partner direction search means 302, arrives, and the directivity information output from the sound-except-conversation-partner-voice determination means 307. Further, the directivity/non-directivity determination means 308 outputs the determination result that the directivity is not formed to the direction-except-conversation-partner-direction directivity synthesis means 304.

The direction-except-conversation-partner-direction directivity synthesis means 304 conducts signal processing for forming the directivity based on the determination result of the directivity/non-directivity determination means 308. Upon receiving the determination result that the directivity is formed from the directivity/non-directivity determination means 308, the direction-except-conversation-partner-direction directivity synthesis means 304 forms the directivity in the direction other than the direction of the conversation partner. For example, as indicated by the directivity pattern 802 illustrated in FIG. 8, the direction-except-conversation-partner-direction directivity synthesis means 304 forms the directivity in the direction other than the conversation partner direction for detection of the sound other than the conversation partner voice, thereby enabling the sound arriving from the direction other than the conversation partner direction to be detected from the microphones. On the other hand, upon receiving the determination result that the directivity is not formed from the directivity/non-directivity determination means 308, the direction-except-conversation-partner-direction directivity synthesis means 304 does not conduct signal processing for forming the directivity in the direction other than the direction of the conversation partner.

The conversation partner direction directivity synthesis means 303 conducts signal processing for forming the directivity based on the determination result of the directivity/non-directivity determination means 308. That is, when the directivity/non-directivity determination means 308 determines that the directivity is formed, the conversation partner direction directivity synthesis means 303 conducts the signal processing for forming the directivity in the direction of the conversation partner based on the picked-up voice data of the conversation partner and the information on the direction from which the voice of the conversation partner arrives.

For example, the conversation partner direction directivity synthesis means 303 changes the directivity to the direction of the conversation partner as indicated by the directivity pattern 701 of FIG. 7 and the directivity pattern 801 illustrated in FIG. 8. On the other hand, when the directivity/non-directivity determination means 308 determines that the directivity is not formed, the conversation partner direction directivity synthesis means 303 does not conduct the signal processing for forming the directivity. Then, the voice data of the conversation partner in which the directivities are synthesized is output to the speaker 309.

The speaker 309 is a voice output means, and outputs the sound of the conversation partner emphasized by the directivity formed by the conversation partner direction directivity synthesis means 303. As a result, the wearer of the audio signal processing device 300 can listen to the emphasized sound of the conversation partner.

Further, when the directivity is also formed in the direction other than the direction of the conversation partner for call detection by the direction-except-conversation-partner-direction directivity synthesis means 304, the speaker 309 can output the sound other than the conversation partner voice, arriving from the direction other than the conversation partner direction, which has been picked up by the microphones 301a and 301b, while outputting the sound of the conversation partner. As a result, the wearer of the audio signal processing device 300 can also listen to the sound other than the conversation partner voice, arriving from the direction other than the conversation partner direction, in addition to the emphasized sound of the conversation partner.

<Operation of Audio Signal Processing Device 300>

Figure 14:
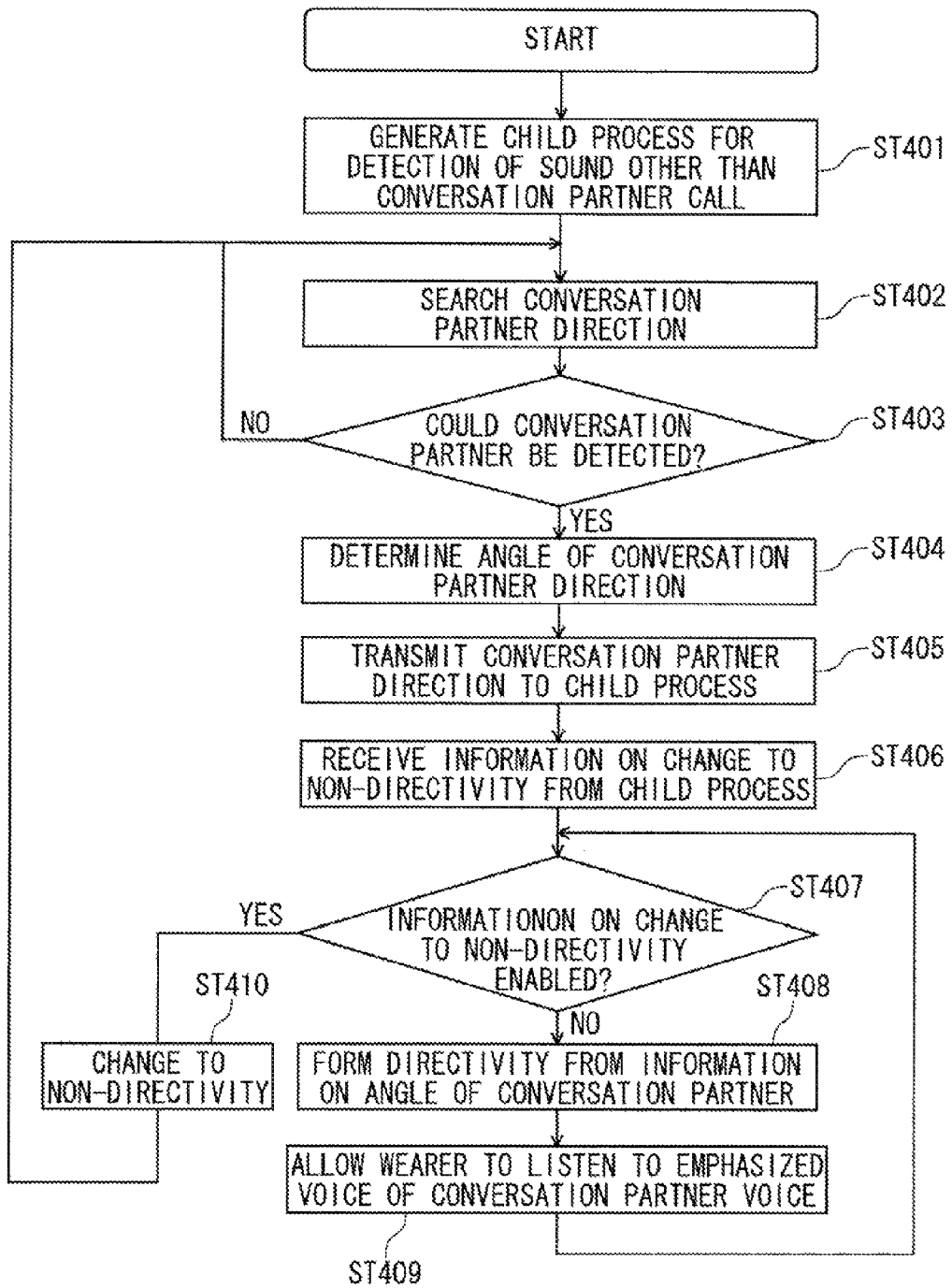
FIG. 14 is a flowchart illustrating a processing procedure of the audio signal processing device according to the third embodiment of the present invention.
Figure 15:
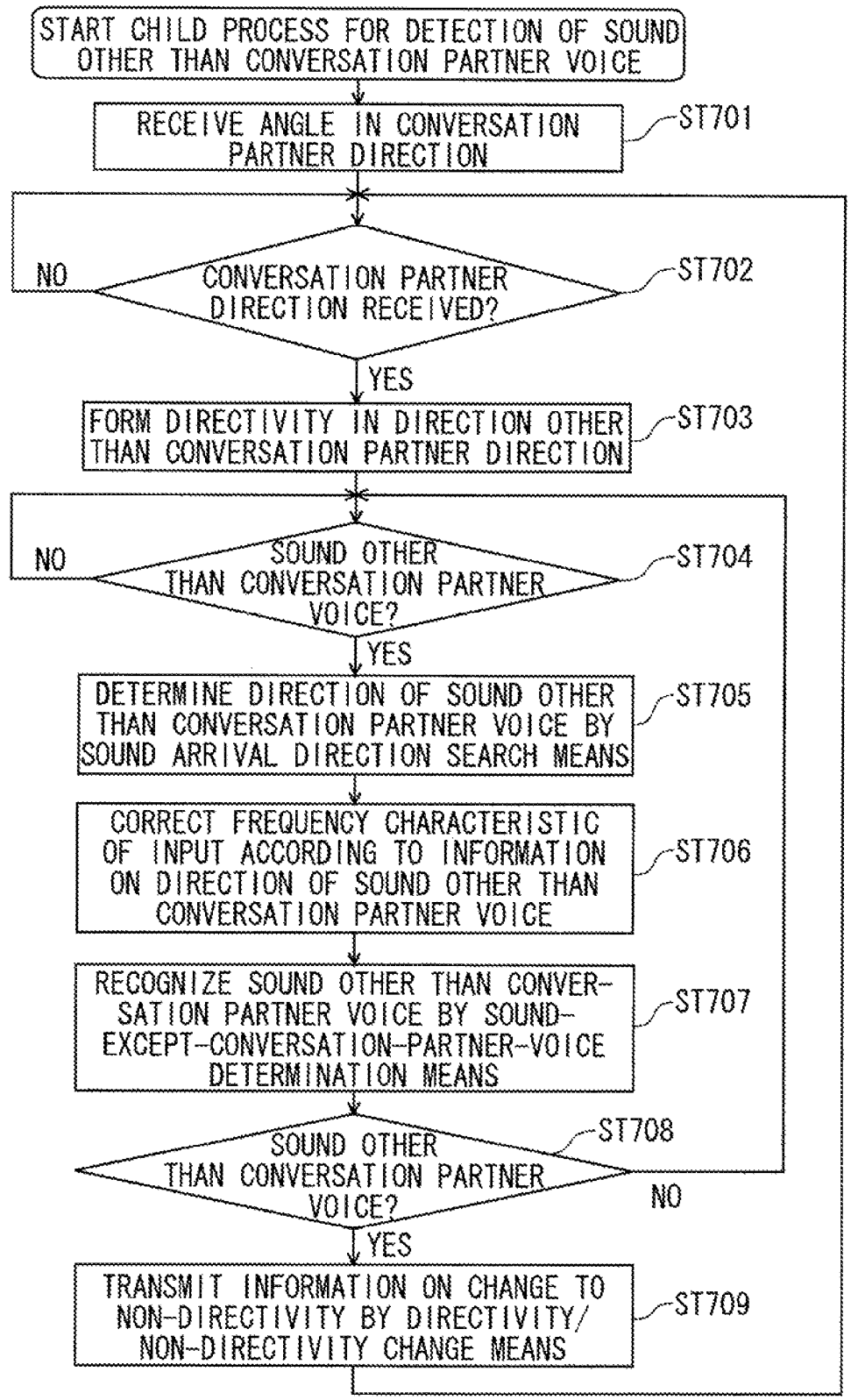
FIG. 15 is a flowchart illustrating a child process for detection of sound other than the voice of a conversation partner in FIG. 14.

FIG. 14 is a flowchart illustrating a processing procedure of the audio signal processing device 300 according to the third embodiment. FIG. 15 is a flowchart illustrating a child process for detection of the sound other than the conversation partner voice. The processing procedure of the audio signal processing device 300 will be described below with reference to the flowcharts of FIGS. 14 and 15. At first, no conversation starts, and the person A who wears the audio signal processing device 300 on his right ear can hear voices from all directions through the signal processing allocating no directivity as indicated by the directivity pattern 601 of FIG. 6. The sound pick-up state illustrated in FIG. 6 is described in the case of the first embodiment. However, the same can be also applied to the case of this embodiment.

In Step ST401, the child process for detection of the sound other than the conversation partner voice is generated. In Step ST402, an arrival direction of the voice of the conversation partner is searched by the conversation partner direction search means 302.

In Step ST403, it is detected by the conversation partner direction search means 302, whether there is a conversation partner, based on a result in Step ST402. If the voice of the conversation partner is detected, the processing is branched to Step ST404, and if no voice of the conversation partner is detected, the processing is branched to Step ST402.

In Step ST404, a voice arrival direction of the conversation partner is detected as an angle by the conversation partner direction search means 302.

In Step ST405, the direction of the conversation partner, which has been detected in Step ST404, is transmitted, as the angle, to Step ST701 of the child process for detection of the sound other than the conversation partner illustrated in FIG. 15.

In Step ST406, information on the change to the non-directivity, which has been transmitted from the child process for detection of the sound other than the conversation partner illustrated in FIG. 15, is received.

In Step ST407, when it is determined by the directivity/non-directivity determination means 308 that the directivity is synthesized in the direction of the conversation partner, the processing is branched to Step ST408. Also, in Step ST407, when it is determined by the directivity/non-directivity determination means 308 that no directivity is formed, that is, when the directivity is changed to non-directivity, the processing is branched to Step ST410.

In Step ST408, the directivity is synthesized to the direction of a conversation partner B according to the picked-up voice data of the conversation partner and the direction information on the conversation partner direction as indicated by the directivity pattern 701 of FIG. 7.

In Step ST409, the voice data of the conversation partner B in which the directivity is synthesized as illustrated in FIG. 7 is output from the speaker 309, and the wearer A of the audio signal processing device 300 listens to the emphasized sound of the conversation partner. The directivity illustrated in FIG. 7 is described in the case of the first embodiment, but can be likewise applied to the case of this embodiment.

In Step ST410, the directivity is changed to non-directivity as indicated by the directivity pattern 601 illustrated in FIG. 6, and the processing is returned to Step ST401.

<Child Process for Detection of Sound Other than Conversation Partner>

Subsequently, the child process for detection of the sound other than the conversation partner illustrated in FIG. 15 will be described below. In Step ST701, an angle indicative of the arrival direction of the sound of the conversation partner, which has been transmitted in Step ST405 illustrated in FIG. 14 is received.

In Step ST702, if the angle indicative of the arrival direction of the sound of the conversation partner is received, the processing is branched to Step ST703, and if the angle indicative of the arrival direction of the sound of the conversation partner is not received, the processing is branched to Step ST702.

In Step ST703, the directivity is formed in the conversation partner direction for the purpose of allowing the wearer A of the audio signal processing device 300 to emphatically listen to the voice of the conversation partner B as indicated by the directivity pattern 801 illustrated in FIG. 8. Also, the directivity is also formed in the directions other than the conversation partner direction for detection of the sound other than the conversation partner voice as indicated by the directivity pattern 802 illustrated in FIG. 8. The directivity illustrated in FIG. 8 is described in the case of the first embodiment, but can be likewise applied to the case of this embodiment.

In Step ST704, it is determined whether there is a sound other than the conversation partner voice. If it is determined that there is a sound other than the conversation partner voice, the processing is branched to Step ST705, and if it is determined that there is no sound other than the conversation partner voice, the processing is branched to Step ST704. In this example, as one conceivable method for determination of whether there is a sound other than the conversation partner voice, for example, there is a determination of whether the power of the input sound exceeds a given threshold value.

In Step ST705, the direction of the sound other than the conversation partner voice is determined by the sound-except-conversation-partner-voice direction search means 306.

In Step ST706, the correction factor of the frequency characteristic for correcting the voice data which is an input of the sound-except-conversation-partner-voice determination means is called from the information on the angle of the sound other than the conversation partner voice and applied as needed. How to determine the correction factor of the frequency characteristic will be described later.

In Step ST707, it is determined by the sound-except-conversation-partner-voice determination means 307 whether the corrected input voice data is the sound other than the conversation partner voice.

In Step ST708, if it is determined in Step ST707 that the input voice data is the sound other than the conversation partner voice, the processing is branched to ST709, and if it is determined that the input voice data is not the sound other than the conversation partner voice, the processing is branched to ST704.

In Step ST709, the information on the change to non-directivity is transmitted to the conversation partner direction directivity synthesis means 303 and the direction-except-conversation-partner-direction directivity synthesis means 304 by the directivity/non-directivity determination means 308, and the processing is returned to Step ST702.

Through the above-mentioned Step ST401 to Step ST410, and Step ST701 to Step ST709, the audio signal processing device 300 according to this embodiment emphasizes the voice of the conversation partner, and changes the directivity to the non-directivity when the sound other than the conversation partner voice is detected. For that reason, the user of the hearing aid can listen to the sound other than the conversation partner voice, and also can have a conversation with a person issuing the sound other than the conversation partner voice.

<How to Determine Correction Factor of Frequency Characteristic>

Subsequently, a description will be given of a specific example of a method for calling the correction factor of the frequency characteristic in Step ST706. For example, a description will be given of the correction factor of the frequency characteristic when the wearer A wears the audio signal processing device 300 on a lateral side of his right head with reference to FIGS. 4 and 5. FIG. 4 is a diagram of frequency characteristics depending on a direction (angle) when the microphone is worn on the lateral side of his right head. FIG. 5 is a diagram illustrating the correction factor for correcting the input voice to the frequency characteristic of the microphone at the time of creating the audio standard pattern according to the first embodiment of the present invention. The frequency characteristic illustrated in FIG. 4 and the correction factor illustrated in FIG. 5 are described in the case of the first embodiment, but can be likewise applied to the case of this embodiment.

As illustrated in FIG. 4, when the wearer A wears the audio signal processing device 300 on the lateral side of his right head, the curve 401 indicative of the frequency characteristic of sound arrival at an angle of 90° from the right is substantially flat not depending on the frequency at a lower frequency side, and slightly falls at a higher frequency side. On the other hand, the curve 402 indicative of the frequency characteristic of sound arrival at an angle of 90° from the left falls more toward a higher frequency region. In this case, the correction factor is determined so that the frequency characteristic of the sound indicated by FIG. 4 is changed to the frequency characteristic of the microphone at the time of creating the audio standard pattern, which is indicated by a broken line 501 in FIG. 5. The frequency characteristic of the microphone at the time of creating the audio standard pattern is used in the sound-except-conversation-partner-voice determination processing unit.

In the case of the frequency characteristic (curve 401) of the sound arrival at an angle of 90° from the right illustrated in FIG. 4, there is no need to correct the low frequency portion, but there is required a correction for changing the frequency characteristic as indicated by an arrow in the high frequency portion. Likewise, in the case of the frequency characteristic (curve 402) of the sound arrival at an angle of 90° from the left illustrated in FIG. 4, the correction factor is more increased toward the higher frequency in the intermediate and high frequencies, thereby enabling the input voice to be corrected to the frequency characteristic of the microphone at the time of creating the audio standard pattern, which is indicated by the broken line 501 in FIG. 5.

As described above, in the audio signal processing device 300 according to this embodiment, the frequency characteristic of the input voice is brought close to the frequency characteristic of the voice data at the time of learning the audio standard pattern (in off line) used for checking the voice recognition in the sound-except-conversation-partner-voice determination processing means 307 processing unit with the use of the correction factor. As a result, the real-time processing can be realized without deteriorating the voice recognition precision.

The correction factor may be a value that has been already measured in a general head shape.

In order to more enhance the precision of the voice recognition, at the time of fitting the audio signal processing device 300, as illustrated in FIG. 9, a sound (white noise) for acquiring the correction factors from the sound sources 901 to 908, which surrounds the periphery of the head of the person A who wears the audio signal processing device 300 on his right ear is reproduced. Then, the reproduced white noise is picked up by the microphones of the audio signal processing device 300, and the correction factors are acquired according to the characteristics of the picked-up sound and the characteristics of the microphones at the time of creating the audio standard pattern, which is preferable. The correction factor illustrated in FIG. 9 is described in the case of the first embodiment, but can be likewise applied to the case of this embodiment.

The call word is applied to not only words used when a person calls, but also ringing tones of announcements which are reproduced for the purpose of inviting persons' attention, warning tones in train platforms, klaxons of vehicles, trucks, or buses, audible alarms interlocked with direction indicators, and warming sound produced by household electrical appliances at home for announcing a progress state.

(Fourth Embodiment)

In the third embodiment, the audio signal processing device of the type worn on any one ear (right ear) is described as one example. In a fourth embodiment, an audio signal processing device of the type worn on both ears is described as another example.

Figure 16:
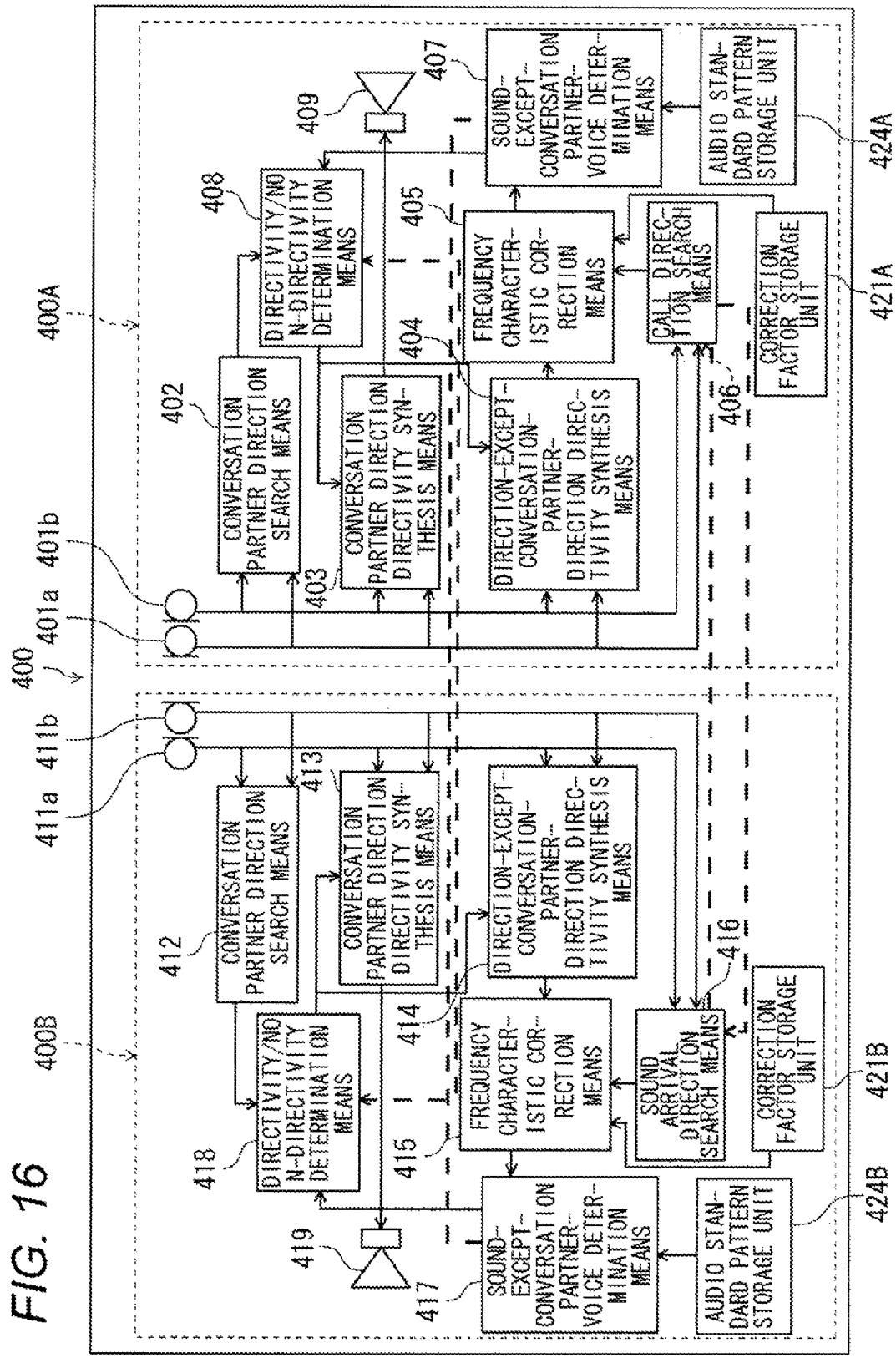
FIG. 16 is a system configuration diagram illustrating an audio signal processing device according to a fourth embodiment of the present invention.

FIG. 16 is a block diagram illustrating a configuration of an audio signal processing device 400 according to a fourth embodiment of the present invention. As illustrated in FIG. 16, the audio signal processing device 400 according to the fourth embodiment includes a right ear worn audio signal processing device 400A, and a left ear worn audio signal processing device 400B. Referring to FIG. 16, configurations of the respective audio signal processing devices will be described below.

As illustrated in FIG. 16, the right ear worn audio signal processing device 400A configuring the audio signal processing device 400 of the fourth embodiment includes two microphones 401a and 401b, a conversation partner direction search means 402, a conversation partner direction directivity synthesis means 403, a direction-except-conversation-partner-direction directivity synthesis means 404, a frequency characteristic correction means 405, a sound arrival direction search means 406, a sound-except-conversation-partner-voice determination means 407, a directivity/non-directivity determination means 408, a speaker 409, a correction factor storage unit 421A, and an audio standard pattern storage unit 424A.

Likewise, the left ear worn audio signal processing device 400B configuring the audio signal processing device 400 of the fourth embodiment includes two microphones 411a and 411b, a conversation partner direction search means 412, a conversation partner direction directivity synthesis means 413, a direction-except-conversation-partner-direction directivity synthesis means 414, a frequency characteristic correction means 415, a sound arrival direction search means 416, a sound-except-conversation partner-voice determination means 417, a directivity/non-directivity determination means 418, a speaker 419, a correction factor storage unit 421B, and an audio standard pattern storage unit 424B.

Hereinafter, the configuration of the right ear worn audio signal processing device 400A will be described in detail. In the left ear worn audio signal processing device 400B, all of the configurations of the same names as those in the right ear worn audio signal processing device 400A are identical in operation with the configurations of the right ear worn audio signal processing device 400A, and therefore their detailed description will be omitted.

<Configuration of Right Ear Worn Audio Signal Processing Device 400A>

The microphones 401a and 401b each pick up an arrival sound such as the voice of the conversation partner, and convert the picked-up sound into an audio signal. Then, the audio signal is output to the conversation partner direction search means 402.

Hereinafter, for description, it is assumed that the sound picked up by each of the microphones includes, in addition to the voice of the conversation partner, a voice (hereinafter referred to as "sound other than the conversation partner voice") with which a person other than a partner who is presently having a conversation calls for a wearer of the audio signal processing device 400 from a direction different from the direction along which the conversation partner exists. Also, it is assumed that the sound other than the conversation partner voice is issued from a right side of the wearer of the audio signal processing device 400.

When the voice of the conversation partner is not picked up by the microphones 401a and 401b, it is assumed that the directivity pattern 601 illustrated in FIG. 6 is formed (created) as in the third embodiment. The sound pickup state illustrated in FIG. 6 is described in the case of the first embodiment, but can be likewise applied to the case of this embodiment.

The conversation partner direction search means 402 detects the voice data of the conversation partner based on the audio signals input from the microphones 401a and 401b, and searches an arrival direction of the picked-up voice of the conversation partner. Then, the direction from which the searched voice of the conversation partner arrives is output to the directivity/non-directivity determination means 408.

The sound arrival direction search means 406 searches the arrival direction according to the sound other than the conversation partner voice picked up by the microphones 401a and 401b. The determination of whether there is the sound other than the conversation partner voice is based on, for example, whether a power of the input voice exceeds a given threshold value.

The sound arrival direction search means 406 first transmits a maximum sound pressure of the right ear to the sound arrival direction search means 416 of the left ear worn audio signal processing device 400B through a radio communication means such as Bluetooth (Japanese Trademark Registration No. 4477936). Likewise, the sound arrival direction search means 406 receives a maximum sound pressure of the left ear from the sound arrival direction search means 416 of the left ear worn audio signal processing device 400B through the radio communication means such as Bluetooth (Japanese Trademark Registration No. 4477936).

Then, the sound arrival direction search means 406 compares the maximum sound pressures of both ears with each other, and estimates at which of the right and left sides the sound other than the conversation partner voice is issued. For example, as a method of searching the direction of the sound other than the conversation partner voice, if it is determined that the sound other than the conversation partner voice is issued at the right side, the sound arrival direction search means 406 searches the direction of the sound other than the conversation partner voice by realization of a directivity beam due to a delayed sum array, and estimation of a sound source direction due to scanning of the directivity beam. The sound arrival direction search means 406 outputs information on a direction estimated as the direction from which the sound other than the conversation partner voice arrives based on the searched sound other than the conversation partner voice to the frequency characteristic correction means 405.

The correction factor storage unit 421A stores the correction factor for each angle in the directivity characteristic of the frequency of the input voice therein. The correction factor takes an influence of the head shape when the audio signal processing device is worn on the head into account.

The audio standard pattern stored in the audio standard pattern storage unit 424A is a pattern created in advance according to a large amount of data of the sound other than the conversation partner voice, which has been picked up with the use of the microphones having one characteristic.

The frequency characteristic correction means 405 corrects the data of the sound other than the conversation partner voice, which has been output from the direction-except-conversation-partner-direction directivity synthesis means 404 so as to provide the same characteristic as that of the microphone at the time of creating the audio standard pattern at any time, with the use of the correction factor in the direction that matches the direction of the call voice among the correction factors stored in the correction factor storage unit 421A, based on the information on the direction (angle) estimated as the arrival direction of the sound other than the conversation partner voice input from the sound arrival direction search means 406. Then, the corrected data of the sound other than the conversation partner voice is output to the sound-except-conversation-partner-voice determination means 407.

The sound-except-conversation-partner-voice determination means 407 checks the audio standard pattern stored in the audio standard pattern storage unit 424A against data of the sound other than the conversation partner voice, which has been output from the frequency characteristic correction means 405, to determine whether the audio standard pattern is the sound other than the conversation partner voice.

When the sound-except-conversation-partner-voice determination means 407 determines that the audio standard pattern is the sound other than the conversation partner voice, the sound-except-conversation-partner-voice determination means 407 outputs a flag indicative of the sound other than the conversation partner voice to the directivity/non-directivity determination means 408 and the directivity/non-directivity determination means 418 of the left ear worn audio signal processing device 400B. On the other hand, when the sound-except-conversation-partner-voice determination means 407 determines that the audio standard pattern is not the sound other than the conversation partner voice, the sound-except-conversation-partner-voice determination means 407 does not output the flag indicative of the sound other than the conversation partner voice to the directivity/non-directivity determination means 408 and the directivity/non-directivity determination means 418 of the left ear worn audio signal processing device 400B.

The directivity/non-directivity determination means 408 determines whether the directivity is formed by each of the conversation partner direction directivity synthesis means 403 and the direction-except-conversation-partner-direction directivity synthesis means 404, based on the arrival direction of the voice of the conversation partner input from the conversation partner direction search means 402, and the determination result of the sound-except-conversation-partner-voice determination means 407.

That is, when the sound other than the conversation partner voice from a person other than the conversation partner is included in the voice data in addition to the voice of the conversation partner, if the direction (angle) from which the voice of the conversation partner, which has been input from the conversation partner direction search means 402, arrives, is output, and the flag indicative of the sound other than the conversation partner voice are output from the sound-except-conversation-partner-voice determination means 407, the directivity/non-directivity determination means 408 outputs the determination result that the directivity is formed in the conversation partner direction to the conversation partner direction directivity synthesis means 403. Further, the directivity/non-directivity determination means 408 outputs the determination result that the directivity is also formed in the direction other than the direction of the conversation partner to the direction-except-conversation-partner-direction directivity synthesis means 404.

On the other hand, when the sound other than the conversation partner voice is not included in the voice data, and the flag indicative of the sound other than the conversation partner voice is not output from the sound-except-conversation-partner-voice determination means 407, the directivity/non-directivity determination means 408 outputs the determination result that the directivity is formed in the conversation partner direction based on the direction (angle) from which the voice of the conversation partner, which has been input from the conversation partner direction search means 402, arrives, and the directivity information output from the sound-except-conversation-partner-voice determination means 407. Further, the directivity/non-directivity determination means 408 outputs the determination result that the directivity is not formed to the direction-except-conversation-partner-direction directivity synthesis means 404.

The direction-except-conversation-partner-direction directivity synthesis means 404 conducts the signal processing for forming the directivity based on the determination result of the directivity/non-directivity determination means 408. Upon receiving the determination result for forming the directivity from the directivity/non-directivity determination means 408, the direction-except-conversation-partner-direction directivity synthesis means 404 forms the directivity in the direction other than the direction of the conversation partner. For example, as indicated by the directivity pattern 802 illustrated in FIG. 8, the directivity is also formed in the direction other than the conversation partner direction for detection of the sound other than the conversation partner voice, thereby enabling the sound arriving from the direction other than the conversation partner direction to be detected from the microphones. On the other hand, upon receiving the determination result for forming no directivity from the directivity/non-directivity determination means 408, the direction-except-conversation-partner-direction directivity synthesis means 404 does not conduct the signal processing for forming the directivity in the direction other than the direction of the conversation partner. The directivity illustrated in FIG. 8 is described in the case of the first embodiment, but can be likewise applied to the case of this embodiment.

The conversation partner direction directivity synthesis means 403 conducts signal processing for forming the directivity based on the determination result of the directivity/non-directivity determination means 408. That is, when the directivity/non-directivity determination means 408 determines that the directivity is formed, the conversation partner direction directivity synthesis means 403 conducts the signal processing for forming the directivity in the direction of the conversation partner based on information on the picked-up voice data of the conversation partner and the direction from which the voice of the conversation partner arrives.

For example, as in the third embodiment, the conversation partner direction directivity synthesis means 403 changes the directivity to the direction of the conversation partner as indicated in the directivity pattern 701 of FIG. 7 and the directivity pattern 801 illustrated in FIG. 8. On the other hand, when the directivity/non-directivity determination means 308 determines that the directivity is not formed, the conversation partner direction directivity synthesis means 403 does not conduct the signal processing for forming the directivity. The directivity illustrated in FIG. 7 is described in the case of the first embodiment, but can be likewise applied to the case of this embodiment.

The voice data of the conversation partner synthesized with the directivities is output to the speaker 409.

The speaker 409 is a sound output means, and outputs the sound of the conversation partner which has been emphasized by the directivity formed by the conversation partner direction directivity synthesis means 403. As a result, the wearer of the audio signal processing device 400 can listen to the emphasized sound of the conversation partner.

Further, when the directivity is formed in the direction other than the conversation partner direction for detection of the sound other than the conversation partner voice by the direction-except-conversation-partner-direction directivity synthesis means 404, the speaker 409 can output the sound other than the conversation partner voice, arriving from the direction other than the conversation partner direction, which has been picked up by the microphones 401a and 401b, while outputting the sound of the conversation partner. As a result, the wearer of the audio signal processing device 400 can also listen to the sound other than the conversation partner voice, arriving from the direction other than the conversation partner direction in addition to the emphasized sound of the conversation partner.

<Operation of Audio Signal Processing Device 400>

Figure 17:
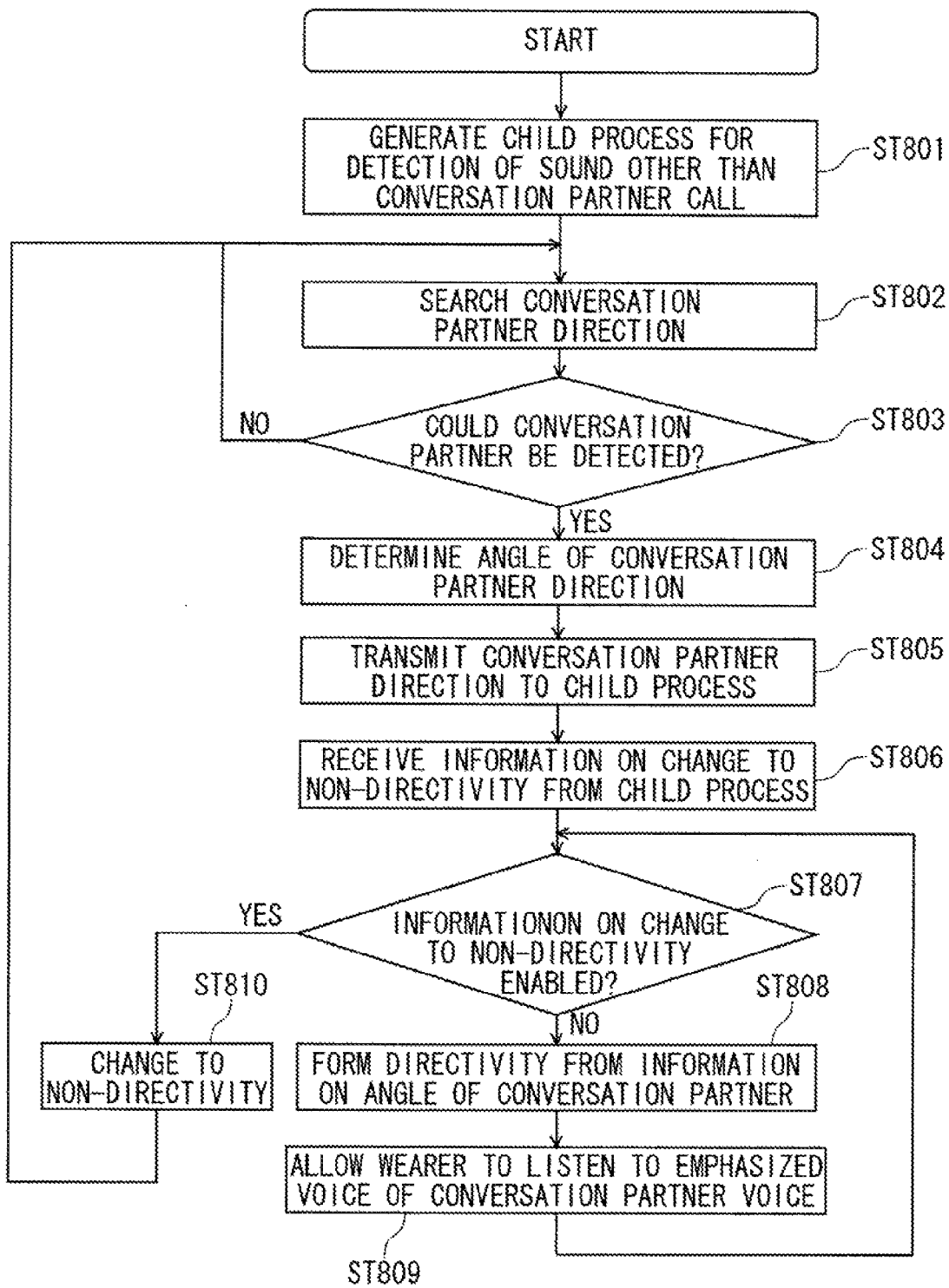
FIG. 17 is a flowchart illustrating a processing procedure of the audio signal processing device according to the fourth embodiment of the present invention.

FIG. 17 is a flowchart illustrating a processing procedure of the audio signal processing device 400 according to the fourth embodiment. FIG. 18 is a flowchart illustrating a child process for detection of the sound other than the conversation partner voice. The processing procedure of the audio signal processing device 400 will be described below with reference to the flowcharts of FIGS. 17 and 18. At first, no conversation starts, and a person can hear voices from all directions as indicated by the directivity pattern 601 of FIG. 6.

In Step ST801, the child process for detection of the sound other than the conversation partner voice is generated. In Step ST802, an arrival direction of the voice of the conversation partner is searched by the conversation partner direction search means 402.

In Step ST803, it is detected by the conversation partner direction search means 402, whether there is a conversation partner, based on a result in Step ST802. If the voice of the conversation partner is detected, the processing is branched to Step ST804, and if no voice of the conversation partner is detected, the processing is branched to Step ST802.

In Step ST804, a voice arrival direction of the conversation partner is detected as an angle by the conversation partner direction search means 402.

In Step ST805, the direction of the conversation partner, which has been detected in Step ST804, is transmitted, as the angle, to Step ST901 of the child process for detection of the sound other than the conversation partner voice illustrated in FIG. 18.

In Step ST806, information on the change to the non-directivity, which has been transmitted from the child process for detection of the sound other than the conversation partner illustrated in FIG. 18, is received.

In Step ST807, when it is determined by the directivity/non-directivity determination means 408 that the directivity is synthesized in the direction of the conversation partner, the processing is branched to Step ST808. Also, in Step ST807, when it is determined by the directivity/non-directivity determination means 408 that no directivity is formed, that is, when the directivity is changed to non-directivity, the processing is branched to Step ST810.

In Step ST808, the directivity is synthesized to the direction of the conversation partner B by the conversation partner direction directivity synthesis means 403 according to the picked-up voice data of the conversation partner and the direction information on the conversation partner direction as indicated by the directivity pattern 701 of FIG. 7, as in the third embodiment.

In Step ST809, the voice data of the conversation partner B in which the directivity is synthesized as illustrated in FIG. 7 is output from the speaker 409, and the wearer A of the audio signal processing device 400 listens to the emphasized sound of the conversation partner.

In Step ST810, the directivity is changed to non-directivity as indicated by the directivity pattern 601 illustrated in FIG. 6, and the processing is returned to Step ST801.

<Child Process for Detection of Sound Other than Conversation Partner>

Subsequently, the child process for detection of the sound other than the conversation partner illustrated in FIG. 18 will be described below. In Step ST901, an angle indicative of the arrival direction of the sound of the conversation partner, which has been transmitted in Step ST805 illustrated in FIG. 17 is received.

In Step ST902, if the angle indicative of the arrival direction of the sound of the conversation partner is received, the processing is branched to Step ST903, and if the angle indicative of the arrival direction of the sound of the conversation partner is not received, the processing is branched to Step ST902.

In Step ST903, the directivity is formed in the conversation partner direction for the purpose of allowing the wearer A of the audio signal processing device 400 to emphatically listen to the voice of the conversation partner B as indicated by the directivity pattern 801 illustrated in FIG. 8 as in the third embodiment. Also, in Step ST903, the directivity is also formed in the direction other than the conversation partner direction for call detection as indicated by the directivity pattern 802 illustrated in FIG. 8.

In Step ST904, the right and left audio signal processing devices communicate the maximum sound pressures to each other, and it is determined from which of the right and left sides the sound other than the conversation partner voice is issued, through the sound arrival direction search means 406.

In Step ST906, based on the determination result in ST904, if the sound other than the conversation partner voice is issued at the right side, the processing is branched to Step ST906, and if the sound other than the conversation partner voice is issued at the left side, the processing is branched to Step ST910.

In Step ST906, the direction of the sound other than the conversation partner voice is determined by the sound arrival direction search means 406 of the right ear worn audio signal processing device 400A.

In Step ST907, the correction factor of the frequency characteristic for correcting the voice data, which is an input of the sound-except-conversation-partner-voice determination means, is called from the information on the angle of the sound other than the conversation partner voice, and applied as needed. How to determine the correction factor of the frequency characteristic is identical with that in the third embodiment, and therefore its detailed description will be omitted.

In Step ST908, it is determined whether the corrected input voice data is the sound other than the conversation partner voice, by the sound-except-conversation-partner-voice determination means 407 of the right ear worn audio signal processing device 400A.

In Step ST909, if it is determined in Step ST908 that the corrected input voice data is the sound other than the conversation partner voice, the processing is branched to ST914, and if it is determined that the corrected input voice data is not the sound other than the conversation partner voice, the processing is branched to ST904.

In Step ST910, the direction of the sound other than the conversation partner voice is determined by the sound arrival direction search means 416 of the left ear worn audio signal processing device 400B.

In Step ST911, the correction factor of the frequency characteristic for correcting the voice data which is an input of the sound-except-conversation-partner-voice determination means is called from the information on the angle of the sound other than the conversation partner voice, and applied as needed. How to determine the correction factor of the frequency characteristic is identical with that in the third embodiment, and therefore its detailed description will be omitted.

In Step ST912, it is determined whether the corrected input voice data is the sound other than the conversation partner voice, by the sound-except-conversation partner-voice determination means 417 of the left ear worn audio signal processing device 400B.

In Step ST913, if it is determined in Step ST912 that the input voice data is the sound other than the conversation partner voice, the processing is branched to ST914, and if it is determined that the input voice data is not the sound other than the conversation partner voice, the processing is branched to ST904.

In Step ST914, if the sound other than the conversation partner voice is issued at the right side, the information on the change to non-directivity is transmitted to the conversation partner direction directivity synthesis means 403 and the direction-except-conversation-partner-direction directivity synthesis means 404 of the right ear worn audio signal processing device 400A by the directivity/non-directivity determination means 408 of the right ear worn audio signal processing device 400A, and the processing is returned to Step ST602.

Likewise, if the sound other than the conversation partner voice is issued at the left side, the information on the change to non-directivity is transmitted to the conversation partner direction directivity synthesis means 413 and the direction-except-conversation-partner-direction directivity synthesis means 414 of the left ear worn audio signal processing device 400B by the directivity/non-directivity determination means 418 of the left ear worn audio signal processing device 400B, and the processing is returned to Step ST902.

Through the above-mentioned Step ST801 to Step ST810, and Step ST901 to Step ST914, the audio signal processing device 400 according to this embodiment emphasizes the voice of the conversation partner, and changes the directivity to the non-directivity when called. For that reason, the user of the audio signal processing device can listen to the call voice, and also can have a conversation with a caller.

Also, the respective functional blocks used for description of the above respective embodiments are typically realized as LSIs that are integrated circuits. Those components may be each integrated into one chip, individually, or parts or all of them may be integrated into one chip. In this example, the respective functional blocks are formed of the LSIs. However, the LSI may be called IC, system LSI, super LSI, or ultra LSI according to a difference in the degree of integration.

Also, a technique for the integrated circuit is not limited to the LSI, but may be realized by a dedicated circuit or a general-purpose processor. An FPGA (field programmable gate array) that is programmable after manufacturing of the LSI, or a reconfigurable processor that can reconfigure the connection or setting of circuit cells within the LSI may be employed.

Further, if a technology for the integrated circuit replacing the LSI appears due to the advance of the semiconductor technology or another technology derived therefrom, it is needless to say that the functional blocks may be integrated together by using that technology. There is a possibility that the biotechnology is applied thereto.

The present invention has been described in detail and with reference to the specific embodiments. However, it would be obvious to an ordinary skilled person that the present invention can be variously changed or modified without departing from the spirit and scope of the present invention.

The present invention is based on Japanese Patent Application No. 2009-144271 filed on Jun. 17, 2009, and content thereof is incorporated herein by reference.

Industrial Applicability

The hearing aid apparatus according to the present invention that can detect various sounds such as a call from a person other than a conversation partner by using input signals from two or more microphones, and is useful as a hearing aid.

Description of Reference Signs

101*a*, 101*b*, 201*a*, 201*b*, 211*a*, 211*b*: microphone

301*a*, 301*b*, 401*a*, 401*b*, 411*a*, 411*b*: microphone

102, 202, 212, 302, 402, 412: conversation partner direction search means

103, 203, 213, 303, 403, 413: conversation partner direction directivity synthesis means

104, 204, 214, 304, 404, 414: direction-except-conversation-partner-direction directivity synthesis means

105, 205, 215, 305: frequency characteristic correction processing unit

106, 206, 216: call direction search means

306: sound-except-conversation-partner-voice direction search means

405, 415: frequency characteristic correction means

406, 416: sound arrival direction search means

107, 207, 217: call word determination means

307, 407, 417: sound-except-conversation-partner-voice determination means

108, 208, 218: directivity/non-directivity determination means

109, 209, 219, 309, 409, 419: speaker

110, 221A, 221B, 310, 421A, 421B: correction factor storage unit

112, 223A, 223B: call word character string storage unit

The invention claimed is:

1. A hearing aid apparatus comprising:
a plurality of microphones configured to convert a voice of a conversation partner, and a sound including a call voice other than the conversation partner voice, into audio signals;
a sound arrival direction estimation unit configured to estimate an arrival direction of the call voice other than the conversation partner voice based on the plurality of audio signals converted by the plurality of microphones;
a frequency characteristic correction processing unit configured to correct a frequency characteristic of the call voice other than the conversation partner voice, based on the plurality of audio signals and the estimated arrival direction of the call voice other than the conversation partner voice;
an audio standard pattern storage unit configured to store a call word standard pattern representing features of a phoneme and a syllabic sound based on voice data picked up by a microphone having a predetermined characteristic;
a call word determination unit configured to check the call voice other than the conversation partner voice with the corrected frequency characteristic against the call word standard pattern, and further configured to determine whether the call voice is a call word;
a direction-except-conversation-partner-direction directivity synthesis unit configured to form a directivity in a direction other than the arrival direction of the voice of the conversation partner, based on the determination result of the call word determination unit; and
a voice output unit configured to output the call voice other than the conversation partner voice based on the directivity formed by the direction-except-conversation-partner-direction directivity synthesis unit,
wherein the frequency characteristic correction processing unit corrects the frequency characteristic of the call voice other than the conversation partner voice so as to provide the same characteristic as the predetermined characteristic of the microphone used at the time of creating the call word standard pattern which is used for a check by the call word determination unit.

2. The hearing aid apparatus according to claim 1, further comprising: a conversation partner direction directivity synthesis unit configured to form the directivity in the arrival direction of the voice of the conversation partner, based on the determination result of the call word determination unit,
wherein the call word determination unit checks the voice data of the conversation partner of which the frequency characteristic is corrected by the frequency characteristic correction processing unit against the call word standard pattern, and if the call word determination unit determines that the voice data is the call word, the conversation partner direction directivity synthesis unit forms the directivity in the arrival direction of the voice of the conversation partner, and the direction-except-conversation-partner-direction directivity synthesis unit forms the directivity in the direction other than the arrival direction of the voice of the conversation partner, and the voice output unit outputs the voice of the conversation partner and the call voice other than the conversation partner voice, based on the directivity formed by the conversation partner direction directivity synthesis unit in addition to the directivity formed by the direction-except-conversation-partner-direction directivity synthesis unit.

3. The hearing aid apparatus according to claim 2, wherein the call word determination unit checks the voice data of the conversation partner of which the frequency characteristic is corrected by the frequency characteristic correction processing unit against the call word standard pattern, and if the call word determination unit determines that the voice data is not the call word, the conversation partner direction directivity synthesis unit forms the directivity in the arrival direction of the voice of the conversation partner, and the direction-except-conversation-partner-direction directivity synthesis unit does not form the directivity in the direction other than the arrival direction of the voice of the conversation partner, and the voice output unit outputs the voice of the conversation partner and the call voice other than the conversation partner voice, based on the directivity formed by the direction-except-conversation-partner-direction directivity synthesis unit.

4. A hearing aid apparatus comprising:

a plurality of microphones configured to convert a voice of a conversation partner, and a sound generated by a sound source other than the conversation partner, into audio signals;

a sound arrival direction estimation unit configured to estimate an arrival direction of the sound generated by the sound source other than the conversation partner based on the plurality of audio signals converted by the plurality of microphones;

a frequency characteristic correction processing unit configured to correct a frequency characteristic of the sound generated by the sound source other than the conversation partner, based on the plurality of audio signals and the estimated arrival direction of the sound generated by the sound source other than the conversation partner;

an audio standard pattern storage unit configured to store a standard pattern of the sound generated by the sound source other than the conversation partner based on voice data picked up by a microphone having a predetermined characteristic;

a sound-except-conversation-partner-voice determination unit configured to check the sound generated by the sound source other than the conversation partner with the corrected frequency characteristic against the standard pattern, and further configured to determine whether the sound generated by the sound source other than the conversation partner is an except-conversation-partner sound;

a direction-except-conversation-partner-direction directivity synthesis unit configured to form a directivity in a direction other than the arrival direction of the voice of the conversation partner, based on the determination result of the sound-except-conversation-partner-voice determination unit; and a voice output unit configured to output the sound generated by the sound source other than the conversation partner based on the directivity formed by the direction-except-conversation-partner-direction directivity synthesis unit, wherein the frequency characteristic correction processing unit corrects the frequency characteristic of the sound generated by the sound source other than the conversation partner so as to provide the same characteristic as the predetermined characteristic of the microphone used at the time of creating the standard pattern which is used for a check by the sound-except-conversation-partner-voice determination unit.

5. The hearing aid apparatus to claim 4, further comprising: a conversation partner direction directivity synthesis unit configured to form the directivity in the arrival direction of the voice of the conversation partner, based on the determination result of the sound-expect-conversation-partner-voice determination unit, wherein the sound-except-conversation-partner-voice determination unit checks the voice data of the conversation partner of which the frequency characteristic is corrected by the frequency characteristic correction processing unit against the standard pattern, and if the sound-except-conversation-partner-voice determination unit determines that the voice data is the except-conversation-partner sound, the conversation partner direction directivity synthesis unit forms the directivity in the arrival direction of the voice of the conversation partner, and the direction-except-conversation-partner-direction directivity synthesis unit forms the directivity in the direction other than the arrival direction of the voice of the conversation partner, and the voice output unit outputs the voice of the conversation partner and the sound generated by the sound source other than the conversation partner, based on the directivity formed by the conversation partner direction directivity synthesis unit in addition to the directivity formed by the direction-except-conversation-partner-direction directivity synthesis unit.

6. The hearing aid apparatus according to claim 5, wherein the sound-expect-conversation-partner-voice determination unit checks the voice data of the conversation partner of which the frequency characteristic is corrected by the frequency characteristic correction processing unit against the standard pattern, and if the sound-except-conversation-partner-voice determination unit determines that the voice data is not the except-conversation-partner sound, the conversation partner direction directivity synthesis unit forms the directivity in the arrival direction of the voice of the conversation partner, and the direction-except-conversation-partner-direction directivity synthesis unit does not form the directivity in the direction other than the arrival direction of the voice of the conversation partner, and the voice output unit outputs the voice of the conversation partner and the sound generated by the sound source other than the conversation partner, based on the directivity formed by the direction-except-conversation-partner-direction directivity synthesis unit.

* * * * *